US012794240B2

(12) United States Patent
Lv et al.

(10) Patent No.: US 12,794,240 B2
(45) Date of Patent: Nov. 10, 2026

(54) CHARGING APPARATUS AND ENERGY STORAGE CHARGING APPARATUS

(71) Applicant: Positec Power Tools (Suzhou) Co., Ltd, Jiangsu (CN)

(72) Inventors: Shaofeng Lv, Suzhou (CN); Hongbing Wu, Suzhou (CN); Shiping Jiao, Suzhou (CN); Yi Zhou, Suzhou (CN)

(73) Assignee: Positec Power Tools (Suzhou) Co., LTD., Suzhou (CN)

( * ) Notice: Subject to any disclaimer, the term of this patent is extended or adjusted under 35 U.S.C. 154(b) by 0 days.

(21) Appl. No.: 18/929,578

(22) Filed: Oct. 28, 2024

(65) Prior Publication Data

US 2025/0055306 A1 Feb. 13, 2025

Related U.S. Application Data

(63) Continuation of application No. PCT/CN2023/091438, filed on Apr. 28, 2023.

(30) Foreign Application Priority Data

Apr. 28, 2022 (CN) ......................... 202210457481.3
Aug. 31, 2022 (CN) ......................... 202211058090.0

(51) Int. Cl.
*H02J 7/00* (2026.01)
*H02J 7/06* (2006.01)
(Continued)

(52) U.S. Cl.
CPC ................ *H02J 7/342* (2020.01); *H02J 7/06* (2013.01); *H02J 7/40* (2026.01); *H02J 7/50* (2026.01); *H02J 7/933* (2026.01); *H02J 7/977* (2026.01)

(58) Field of Classification Search
CPC ...... H02J 7/342; H02J 7/06; H02J 7/40; H02J 7/50; H02J 7/933; H02J 7/977; H02J 7/82;
(Continued)

(56) References Cited

U.S. PATENT DOCUMENTS 10,355,611 B2 * 7/2019 Nagashima ............. B60L 53/11
10,483,776 B2 11/2019 Murakami et al.
(Continued)

FOREIGN PATENT DOCUMENTS

CN 102210080 B 6/2015
CN 207670270 U 7/2018
(Continued)

OTHER PUBLICATIONS

International Search Report in Application No. PCT/CN2023/091438, dated Jun. 21, 2023.
(Continued)

*Primary Examiner* — Rexford N Barnie
*Assistant Examiner* — Xuan Ly
(74) *Attorney, Agent, or Firm* — Lee & Hayes, P.C.

(57) ABSTRACT

The disclosure relates to a charging apparatus and an energy storage charging apparatus. The charging apparatus includes a first charging module, a second charging module, and a charging interface module. The first charging module is configured to convert electrical energy stored in the first energy storage module and transmit the converted electrical energy to the second energy storage module. The charging interface module further includes an alternating current input interface, configured to connect to an alternating current power supply. The second charging module is configured to convert alternating current electrical energy into direct current electrical energy to charge the first energy storage module. The second charging module is further configured to convert the alternating current electrical energy into direct current electrical energy to charge the second energy storage module.

20 Claims, 7 Drawing Sheets

(51) Int. Cl.

| | |
|---|---|
| ***H02J 7/34*** | (2006.01) |
| ***H02J 7/40*** | (2026.01) |
| ***H02J 7/50*** | (2026.01) |
| *H02J 7/90* | (2026.01) |

(58) Field of Classification Search

CPC ........ H02J 7/02; H02J 7/42; H02J 7/00; H02J 7/34; Y02T 10/70; Y02T 10/7072

USPC ............................................................ 307/20

See application file for complete search history.

(56) References Cited

U.S. PATENT DOCUMENTS

| | | | | |
|---|---|---|---|---|
| 2015/0171632 | A1 | 6/2015 | Fry et al. | |
| 2018/0076754 | A1 | 3/2018 | White et al. | |
| 2021/0305838 | A1 * | 9/2021 | Stellnert | H02J 7/50 |
| 2025/0088020 | A1 | 3/2025 | Manderle | |

FOREIGN PATENT DOCUMENTS

| | | | |
|---|---|---|---|
| CN | 108702006 | A | 10/2018 |
| CN | 113352917 | A | 9/2021 |
| CN | 113517750 | A | 10/2021 |
| CN | 113752885 | A | 12/2021 |
| CN | 113765163 | A | 12/2021 |
| CN | 116896126 | A | 10/2023 |
| CN | 222484314 | U | 2/2025 |
| EP | 2951879 | B1 | 5/2023 |
| EP | 4178068 | B1 | 4/2024 |

OTHER PUBLICATIONS

Written Opinion in Application No. PCT/CN2023/091438, dated Jun. 21, 2023.

European Search Report for related European Patent Application No. EP23795595.0, dated Jul. 29, 2026, 3 pages.

Supplementary European Search Report for related European Patent Application No. 23795595, dated Jul. 29, 2026, 3 pages.

* cited by examiner

CHARGING APPARATUS AND ENERGY STORAGE CHARGING APPARATUS

CROSS-REFERENCE TO RELATED APPLICATION

This application is a continuation application of PCT Application No. PCT/CN 2023/091438, filed on Apr. 28, 2023, which claims benefit of and priority to Chinese patent application No. 202210457481.3 filed on Apr. 28, 2022, and No. 202211058090.0, filed on Aug. 31, 2022, all of which are hereby incorporated by reference in their entirety for all purpose as if fully set forth here.

TECHNICAL FIELD

The disclosure relates to the field of charging, and in particular, to a charging apparatus and an energy storage charging apparatus.

BACKGROUND

Fuel-type tools have advantages such as strong power, easy access to a power source, and long-lasting working time. For a professional gardening team, in an outdoor operation scenario, to improve working efficiency, the gardening team usually uses fuel-type gardening tools to carry out operation. However, exhaust gases released during use of a fuel-type tool cause environmental pollution, and noise during working of a fuel-type powered tool is large, which may form noise pollution to a surrounding environment.

Electrical tools have advantages of being environmentally friendly and clean. In addition, compared with a fuel-type powered tool, an electrical tool generates smaller noise. Therefore, electrical tools are increasingly favored by users of power tools.

With the development of lithium battery technologies, the tool industry gradually changes from gasoline tools and alternating current electrical tools to direct current electrical tools. Lithium batteries have been widely used in the tool industry. Generally, for a professional gardening work team, the gardening team carries various gardening tools to work outdoors for a day, has a long working time and a large workload, and needs to continuously work for almost a whole day. However, a manner of recharging a lithium battery is usually converting mains electricity into a direct current power supply using a charger, to charge the lithium battery. However, when a gardening team works outdoors, it is difficult to obtain mains electricity, resulting in charging difficulty. To work using an electrical tool, a large quantity of battery packs need to be carried, resulting in high costs of using the battery packs, and inconvenience in carrying the battery packs by the gardening team.

SUMMARY

Based on this, this application provides an energy storage charging apparatus, configured to charge a second energy storage module, wherein the charging apparatus comprises a first charging module, a second charging module, and a charging interface module, wherein the charging interface module comprises at least a first direct current interface unit and a second direct current interface unit, wherein the first direct current interface unit is configured to be connectable to a first energy storage module, and the second direct current interface unit is configured to be connectable to the second energy storage module; the first charging module has a first end connected to the first direct current interface unit and a second end connected to the second direct current interface unit, and is configured to convert electrical energy stored in the first energy storage module and transmit the converted electrical energy to the second energy storage module, to make the first energy storage module to charge the second energy storage module; the charging interface module further comprises an alternating current input interface, wherein the alternating current input interface is configured to be connectable to an alternating current power supply; the second charging module has a first end connected to the alternating current input interface and a second end connected to the first direct current interface unit, and is configured to convert alternating current electrical energy into direct current electrical energy and output the direct current electrical energy to the first direct current interface unit, to charge the first energy storage module; and the second charging module is further configured to convert the alternating current electrical energy into direct current electrical energy, and transmit the direct current electrical energy to the second direct current interface unit not through the first energy storage module, to charge the second energy storage module.

In at least one embodiment, the second charging module has an output end connected to the first charging module, to transmit the direct current electrical energy to the second direct current interface unit through the first charging module.

In at least one embodiment, the charging apparatus further comprising a control module and a switch module, wherein the switch module is connected to the control module and configured to receive a control signal from the control module, to switch on or switch off under the action of the control signal; the switch module comprises a loop switch, wherein the loop switch is arranged between the first charging module and the second direct current interface unit, and is configured to control on-off of a loop from the first charging module to the second direct current interface unit; and the switch module further comprises a charging switch, wherein the charging switch has one end connected to the first direct current interface unit and an other end connected to the first charging module and the second charging module respectively, and is configured to control the first energy storage module to connect to the charging apparatus or disconnect from the charging apparatus.

In at least one embodiment, the control module is configured to determine a type of an input power supply, and control, according to the type of the input power supply, a manner in which the charging apparatus charges the second energy storage module, wherein the input power supply comprises the alternating current power supply and the first energy storage module; when determining that the alternating current power supply and the first energy storage module are both connected, the control module further obtains a requested charging power of the second energy storage module, and determines whether the requested charging power of the second energy storage module is greater than a maximum output power of the second charging module; when the requested charging power of the second energy storage module is less than the maximum output power of the second charging module, the control module controls the charging switch and the loop switch to close simultaneously, and controls the alternating current power supply to charge the second energy storage module and the first energy storage module simultaneously; when the requested charging power of the second energy storage module is greater than the maximum output power of the second charging module, the control module controls the charging switch and the loop switch to close simultaneously, and controls the alternating current power supply and the first energy storage module to charge the second energy storage module simultaneously; and when the requested charging power of the second energy storage module is equal to the maximum output power of the second charging module, the control module controls the charging switch and the loop switch to close sequentially, and controls the alternating current power supply to charge the second energy storage module and the first energy storage module sequentially.

In at least one embodiment, a rated power quantity of the second energy storage module is less than a rated power quantity of the first energy storage module; and when controlling the alternating current power supply to charge the second energy storage module and the first energy storage module sequentially, the control module first controls the loop switch to close, to charge the second energy storage module, and when determining that the second energy storage module is fully charged, the control module then controls the charging switch to close, to charge the first energy storage module.

In at least one embodiment, when determining that only the first energy storage module is connected, the control module controls the loop switch and the charging switch to close, to make the first energy storage module to charge the second energy storage module; and when determining that only the alternating current power supply is connected, the control module controls the loop switch to close and the charging switch to open, to make the alternating current power supply to charge the second energy storage module.

In at least one embodiment, the second charging module has an output end connected to the second direct current interface unit, to directly transmit the direct current electrical energy to the second direct current interface unit.

In at least one embodiment, the first charging module is a bidirectional charging module, and the second energy storage module is further configured to charge the first energy storage module through the first charging module.

In at least one embodiment, the second charging module comprises a first-capacity battery pack and a second-capacity battery pack, wherein a rated capacity of the first-capacity battery pack is greater than a rated capacity of the second-capacity battery pack; and the first charging module is further configured to convert electrical energy stored in the first-capacity battery pack, and charge the second-capacity battery pack.

In at least one embodiment, when charging the second energy storage module, the charging apparatus comprises at least a first charging mode and a second charging mode, wherein an output power of a single charging interface in the second charging mode is greater than an output power of a single charging interface in the first charging mode.

In at least one embodiment, the second direct current interface unit comprises at least one charging interface, wherein each charging interface is configured to detachably connectable to one second energy storage module; and the first charging module comprises at least two charging units, wherein each charging unit has an input end connected to the first direct current interface unit and the second charging module and an output end connected to the at least one charging interface.

In at least one embodiment, the switch module further comprises a switching switch, wherein the switching switch is arranged between adjacent charging units, and is configured to control a connection relationship between the adjacent charging units; when the switching switch is open, output ends of the at least two charging units are connected; and when the switching switch is closed, the output ends of the at least two charging units are disconnected.

In at least one embodiment, in the first charging mode, a single charging unit is configured to supply electrical energy to a single second energy storage module correspondingly connected thereto; and in the second charging mode, the control module obtains the requested charging power of the second energy storage module, compares the requested charging power with a maximum output power of a single charging unit, and determines, according to a comparison result, whether to control the switching switch to close.

In at least one embodiment, when the requested charging power is less than or equal to the maximum output power of the single charging unit, the control module controls the switching switch to open, to make the single charging unit to charge the second energy storage module; and when the requested charging power is greater than the maximum output power of the single charging unit, the control module controls the switching switch to close, to make the at least two charging units to be connected in parallel to charge a single second energy storage module.

In at least one embodiment, the control module is configured to obtain information of an input power supply, and determine, according to the information of the input power supply, whether the charging apparatus is allowed to enter the second charging mode.

In at least one embodiment, the input power supply comprises the alternating current power supply and/or the first energy storage module; when the input power supply is the alternating current power supply, the control module prohibits the charging apparatus from entering the second charging mode; when the input power supply comprises the first energy storage module, and a remaining power quantity of the first energy storage module is less than a preset power quantity, the control module prohibits the charging apparatus from entering the second charging mode; and when the input power supply is the first energy storage module, and the remaining power quantity of the first energy storage module is greater than or equal to the preset power quantity, the charging apparatus is allowed to enter the second charging mode.

In at least one embodiment, the control module obtains a temperature of the second energy storage module and a temperature of the first energy storage module when the input power supply is the first energy storage module, and the remaining power quantity of the first energy storage module is greater than or equal to the preset power quantity, and allows, when the temperature of the second energy storage module and the temperature of the first energy storage module satisfy a preset temperature condition, the charging apparatus to enter the second charging mode.

In at least one embodiment, the charging apparatus further comprising a human-computer interaction module, connected to the control module, and configured to obtain a fast charging instruction delivered by a user, wherein the fast charging instruction is used to instruct the charging apparatus to enter the second charging mode, wherein when the human-computer interaction module does not receive the fast charging instruction, the control module controls the charging apparatus to enter the first charging mode; and when the human-computer interaction module receives the fast charging instruction, the control module controls the charging apparatus to switch from the first charging mode to the second charging mode.

In at least one embodiment, in the first charging mode, when determining that the at least two charging units are each connected to a second energy storage module, the control module is further configured to obtain information of an input power supply, and control, according to the information of the input power supply, the at least two charging units to charge the at least two second energy storage modules simultaneously or sequentially.

In at least one embodiment, when the input power supply is the alternating current power supply, the control module controls the at least two charging units to charge the second energy storage modules simultaneously; when the input power supply comprises the first energy storage module, and a remaining power quantity of the first energy storage module is less than a preset power quantity, the control module controls the at least two charging units to charge the second energy storage modules sequentially; and when the input power supply is the first energy storage module, and the remaining power quantity of the first energy storage module is greater than or equal to the preset power quantity, the control module controls the at least two charging units to charge the second energy storage modules simultaneously.

In at least one embodiment, a single charging unit is connected to at least two charging interfaces; and in the first charging mode, when determining that the plurality of charging interfaces connected to the single charging unit are each connected to a second energy storage module, the control module is further configured to obtain information of the plurality of second energy storage modules and information of the input power supply, and control, based on the information of the plurality of second energy storage modules and the information of the input power supply, the single charging unit to charge the plurality of second energy storage modules and the first energy storage module sequentially according to a preset priority.

In at least one embodiment, the second energy storage module comprises a battery pack and a self-moving tool, wherein the battery pack is configured to be detachably mounted with an electrical tool and supply power to the electrical tool, and the self-moving tool has a built-in battery; the control module determines whether the second energy storage module connected to the charging interface module comprises the battery pack and the self-moving tool, when the second energy storage module comprises the battery pack and the self-moving tool, the control module determines whether the input power supply comprises the alternating current power supply, and when the input power supply comprises the alternating current power supply, a charging priority of the battery pack is higher than a charging priority of the first energy storage module, and the charging priority of the first energy storage module is higher than a charging priority of the self-moving tool; and when the control module determines that the input power supply does not comprise the alternating current power supply, the charging priority of the battery pack is higher than the charging priority of the self-moving tool.

In at least one embodiment, the charging interface comprises at least two types of digital communication terminals, and the charging apparatus is configured to communicate with battery packs of different digital communication types through at least one type of the digital communication terminals.

In at least one embodiment, the control module determines whether each of the charging interfaces is connected to the battery pack, and when each charging interface is connected to the battery pack, the control module further determines a digital communication type of the battery pack connected to each charging interface, and controls a charging priority of the charging apparatus for charging the plurality of battery packs according to the digital communication type.

In at least one embodiment, a digital communication terminal of the charging apparatus comprises a serial communication terminal and a differential communication terminal, the charging apparatus is configured to communicate with a battery pack of a serial communication type through the serial communication terminal, and the charging apparatus is configured to communicate with a battery pack of a differential communication type through the differential communication terminal; the control module determines a digital communication type of the battery pack, and controls a charging priority of the battery pack of the differential communication type to be higher than that of the battery pack of the serial communication type.

In at least one embodiment, when determining that digital communication types of a plurality of battery packs are the same, the control module further obtains a plugging sequence of the plurality of battery packs, and controls a sequence of charging the battery packs by the charging apparatus according to the plugging sequence.

In at least one embodiment, the control module further controls an output power of the charging unit according to a communication type of a battery pack connected to each charging interface; and a charging power output by the charging interface when the control module determines that the charging apparatus communicates with the battery pack by using the serial communication type is less than a charging power output by the charging interface when the charging apparatus communicates with the battery pack by using the differential communication type.

In at least one embodiment, another embodiment of this application provides an energy storage charging apparatus, wherein the energy storage charging apparatus further comprises a first energy storage module, wherein the first energy storage module is connectable to the charging apparatus and configured to charge a second energy storage module through the charging apparatus or obtain electrical energy through the charging apparatus.

In at least one embodiment, another embodiment of this application provides an energy storage charging apparatus. The energy storage charging apparatus includes a first energy storage module, a first charging module, and a charging interface module. The first energy storage module is configured to store direct current electrical energy. The first charging module has an input end connected to an output end of the first energy storage module and an output end connected to the charging interface module. The charging interface module is configured to be connectable to a battery pack. The first charging module is configured to transfer electrical energy of the first energy storage module to the charging interface module, and charge the battery pack connected to the charging interface module. The battery pack is configured to be detachably mounted with an electrical tool, to supply power to the electrical tool. A first charging rate at which the first energy storage module charges the battery pack is greater than a second charging rate at which mains electricity charges the battery pack. A ratio of the first charging rate to the second charging rate is greater than 1 and less than or equal to 10.

In at least one embodiment, for the same battery pack, a first charging time required by the first energy storage module for charging the battery pack from an empty state to a fully charged state is less than a second charging time required by an alternating current power supply for charging the battery pack from the empty state to the fully charged state, wherein the alternating current power supply comprises the mains electricity.

In at least one embodiment, a maximum output power of the first energy storage module is greater than a maximum output power of the alternating current power supply.

In at least one embodiment, the maximum output power of the first energy storage module is greater than or equal to 1.8 KW. In some embodiments, the maximum output power of the first energy storage module is greater than or equal to 3 KW.

In at least one embodiment, a rated power quantity of the first energy storage module is not less than 2 KWh, and a maximum continuous discharging rate of the first energy storage module is greater than or equal to 1 C. The maximum continuous discharging rate is a maximum discharging rate maintained during continuous discharging of the first energy storage module from a remaining power quantity of greater than or equal to 80% to a remaining power quantity of less than or equal to 10%.

In at least one embodiment, a second charging module is further included. The second charging module has an input end, configured to connect to an external alternating current power supply, and is configured to convert electrical energy of the alternating current power supply into direct current electrical energy and charge the battery pack connected to the charging interface module. A maximum output power of the second charging module is less than 1.6 KW.

In at least one embodiment, the first charging module includes at least a first charging unit and a second charging unit. The charging interface module includes at least a first charging interface and a second charging interface. An input end of the first charging unit and an input end of the second charging unit are both connected to an output end of the first energy storage module and an output end of the second charging module. An output end of the first charging unit is connected to the first charging interface. An output end of the second charging unit is connected to the second charging interface.

In at least one embodiment, the switch module includes at least a first switching switch. The first switching switch has one end connected to the output end of the first charging unit and an other end connected to the output end of the second charging unit, and is configured to control a connection relationship between the charging units. When the first switching switch is closed, the output end of the first charging unit and the output end of the second charging unit are connected to each other, to output both electrical energy of the first charging unit and electrical energy of the second charging unit to a same charging interface. When the first switching switch is open, the output end of the first charging unit and the output end of the second charging unit are disconnected, to output the electrical energy of the first charging unit to the first charging interface and the electrical energy of the second charging unit to the second charging interface. The energy storage charging apparatus further includes a control module. The control module is connected to a control terminal of the first switching switch and configured to control the first switching switch to switch between a closed state and an open state.

In at least one embodiment, the energy storage charging apparatus includes at least a first charging mode and a second charging mode. When the control module controls the first switching switch to open, the energy storage charging apparatus is in the first charging mode, and each charging unit respectively provides electrical energy to a single charging interface to which the charging unit is correspondingly connected. When the control module controls the first switching switch to be closed, the energy storage charging apparatus is in the second charging mode, and at least two charging units are connected in parallel to provide electrical energy to one charging interface. A maximum output power output by the charging interface to the battery pack in the first charging mode is less than a maximum output power output by the charging interface to the battery pack in the second charging mode.

In at least one embodiment, in the second charging mode, the maximum output power output by the charging interface to the battery pack is not less than 3.6 KW.

In at least one embodiment, a human-computer interaction module is further included. The human-computer interaction module is connected to the control module. The control module is configured to receive a fast charging instruction through the human-computer interaction module, and control, according to the fast charging instruction, the first switching switch to be closed, to cause the energy storage charging apparatus to enter the second charging mode.

DETAILED DESCRIPTION

To resolve a problem that it is difficult for a gardening team continuously working outdoors for a day to obtain a direct current power supply, this application provides a charging apparatus. The charging apparatus may transfer electrical energy from a direct current electrical energy storage module to one or more battery packs of electrical tools in some embodiments, and may also use an alternating current power supply to recharge the direct current electrical energy storage module and a plurality of battery packs of electrical tools in some embodiments. When a gardening team works outdoors, the charging apparatus is placed on a vehicle to move with the gardening team in some embodiments, and in addition, a large-capacity direct current electrical energy storage module is carried to move from a garden to another garden, to charge a battery pack carried by the gardening team. By carrying such a mobile energy recharging apparatus, in some embodiments, the gardening team is relieved from anxiety about power consumption in using an electrical tool during outdoor working.

Figure 1:
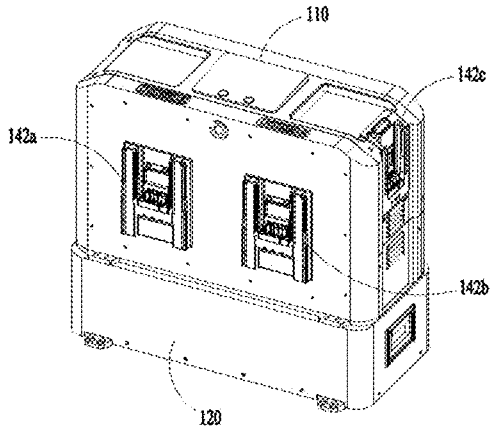
FIG. 1 is an overall structural diagram of an energy storage charging apparatus according to an embodiment of this application.

Referring to FIG. 1, an embodiment of this application provides a charging apparatus 110. In some embodiments, the charging apparatus 110 is connectable to a first energy storage module 120 and configured to convert direct current electrical energy stored in the first energy storage module 120, to charge an external device. The charging apparatus 110 is further connectable to an alternating current power supply, and converts electrical energy of the alternating current power supply into direct current electrical energy, to charge an external device, in some embodiments. In this embodiment, the charging apparatus 110 and the first energy storage module 120 are detachably connected. A first direct current interface unit (not shown in FIG. 1) is arranged on the charging apparatus 110. The first energy storage module 120 is connected to the first direct current interface unit by a cable, to connect to the charging apparatus 110, in some embodiments.

Figure 2:
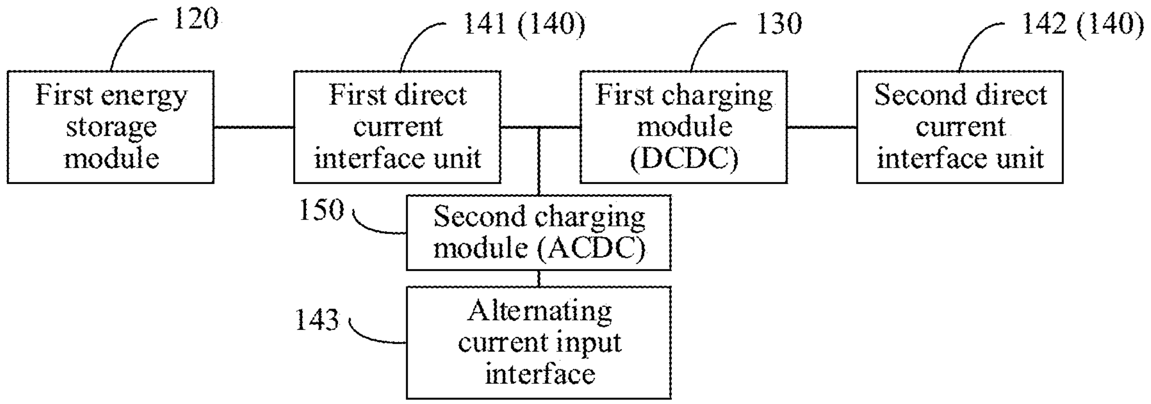
FIG. 2 is a diagram of a circuit module of an energy storage charging apparatus according to an embodiment of this application.

Referring to FIG. 1 and FIG. 2, the charging apparatus includes a first charging module 130, a second charging module 150, and a charging interface module 140. The charging interface module 140 includes at least a first direct current interface unit 141 and a second direct current interface unit 142. The first direct current interface unit 141 is configured to be connectable to a first energy storage module 120. The second direct current interface unit 142 is configured to be connectable to the second energy storage module. As shown in FIG. 1, the second direct current interface unit 142 is arranged on a housing of the charging apparatus 110. In this embodiment, the second energy storage module includes a battery pack of an electrical tool in some embodiments. The battery pack of the electrical tool is directly plugged to the second direct current interface unit 142 in some embodiments.

The first charging module 130 has a first end connected to a first direct current interface unit 141 and a second end connected to a second direct current interface unit 142, and is configured to convert direct current electrical energy stored in the first energy storage module 120, to charge the second energy storage module. That is, the first charging module 130 is a direct current-direct current (DCDC) module. The first charging module 130 is configured to convert direct current electrical energy stored in the first energy storage module 120 into direct current electrical energy suitable for charging the second energy storage module. Generally, the first charging module 130 is configured to perform voltage conversion, to convert a voltage received at an input end into an output voltage adapted to the second energy storage module.

The charging interface module 140 further includes an alternating current input interface 143. The alternating current input interface 143 is configured to connect to an alternating current power supply. The second charging module 150 has a first end connected to the alternating current input interface 143 and a second end connected to the first direct current interface unit 141, and is configured to convert electrical energy of the alternating current power supply into direct current electrical energy, and output the direct current electrical energy to the first direct current interface unit 141, to charge the first energy storage module 120. That is, the second charging module 150 is an alternating current-direct current (ACDC) module.

The second charging module 150 is further configured to convert the electrical energy of the alternating current power supply into direct current electrical energy, and transmit the direct current electrical energy to the second direct current interface unit 142 not through the first energy storage module, to charge the second energy storage module by using the direct current electrical energy.

In this embodiment, the charging apparatus 110 includes both a DCDC charging module and an ACDC charging module, and is connected to the direct current power supply or the alternating current power supply in some embodiments. When the gardening team works outdoors during the day, and no alternating current power supply is available, in some embodiments, the second energy storage module (for example, a battery pack of an electrical tool) is charged using direct current electrical energy directly by carrying a large-capacity first energy storage module 120, thereby relieving the gardening team from anxiety about power consumption during outdoor working. When the gardening team does not work at night, the second energy storage module and the first energy storage module that needs to be carried outdoors as a charging power supply are charged by using the alternating current power supply in some embodiments, so that the gardening team can carry a plurality of fully charged battery packs and a fully charged direct current power supply during outdoor working. In addition, when the second energy storage module is charged using the alternating current power supply, electrical energy of the alternating current power supply does not need to be stored in the first energy storage module first and then released to the second energy storage module, so that a service life of the first energy storage module is not lost in some embodiments, and a use time of the first energy storage module is prolonged.

In at least one embodiment, the first direct current interface unit 141 includes a plurality of first direct current interfaces in some embodiments. The plurality of first direct current interfaces are connected in parallel to the first charging module 130 and the second charging module 150, so that a plurality of first energy storage modules 120 connected to the plurality of first direct current interfaces are connected in parallel, to implement capacity expansion.

In at least one embodiment, there are a plurality of implementations in which the second charging module 150 charges the first energy storage module 120 and the second energy storage module.

In an example, as shown in FIG. 2, the second charging module 150 is directly connected to the first energy storage module 120 by the first direct current interface unit 141 in some embodiments, so that an external alternating current power supply charges the first energy storage module 120 through the second charging module 150. The second charging module 150 is further connected to the first charging module 130, so that after alternating current electricity generated by an external alternating current power supply is converted into direct current electricity by the second charging module 150, the direct current electricity is then converted by the first charging module 130 into direct current electrical energy suitable for charging an external second energy storage module. Therefore, the external alternating current power supply can charge the first energy storage module 120 and the second energy storage module that have different rated voltages.

Figure 3:
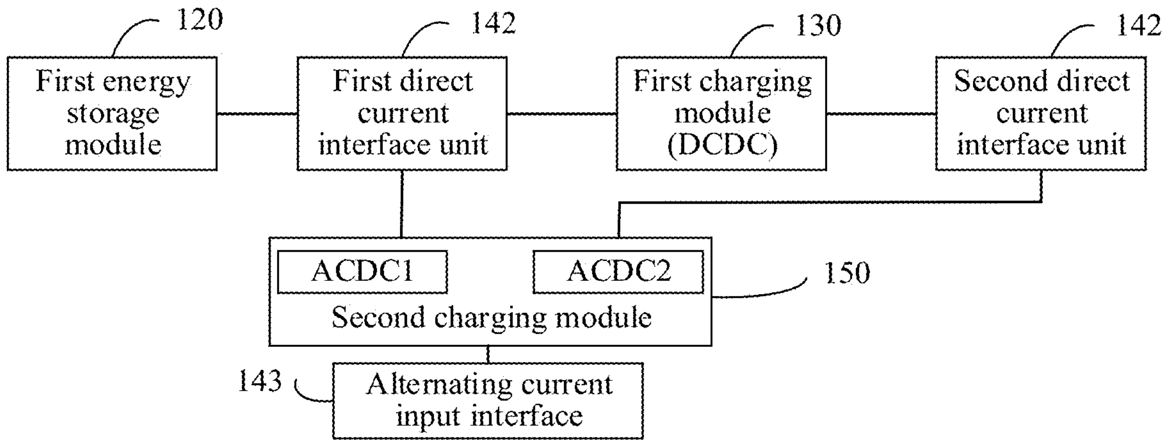
FIG. 3 is a diagram of a circuit module of an energy storage charging apparatus according to another embodiment of this application.

In another example, when a rated voltage of the second energy storage module is different from a rated voltage of the first energy storage module 120, the second charging module 150 further includes two ACDC modules in some embodiments. As shown in FIG. 3, the second charging module 150 includes an ACDC1 module and an ACDC2 module. The ACDC1 module is connected to the first direct current interface unit 141, and the ACDC2 module is connected to the second direct current interface unit 142. Therefore, an external power supply charges the first energy storage module 120 through the ACDC1 module, and charges the second energy storage module through the ACDC2 module. The first energy storage module 120 charges the second energy storage module through the DCDC module. It may be understood that when the rated voltage of the second energy storage module is the same as the rated voltage of the first energy storage module 120, the second charging module 150 includes only one ACDC module in some other embodiments. The one ACDC module is connected to the first direct current interface unit 141 and the second direct current interface unit 142 respectively. The ACDC module charges the first energy storage module 120 and the second energy storage module in a time-sharing manner or simultaneously.

Since the rated voltage of the first energy storage module is different from the rated voltage of the second energy storage module in some embodiments, to save costs, and reduce the use of the ACDC module, therefore, in some embodiments, the implementation shown in FIG. 2 is adopted. To be specific, an output end of the second charging module 150 is directly connected to the first direct current interface unit 141, to charge the first energy storage module 120. The second charging module 150 is connected to the second energy storage module by the first charging module 130. The first energy storage module 120 is also connected to the second energy storage module by the first charging module 130. In addition, through such an arrangement, when the alternating current power supply charges the second energy storage module, electrical energy does not need to pass through the first energy storage module 120, thereby reducing a quantity of times of charge and discharge of the first energy storage module 120, and improving a service life of the first energy storage module 120.

Figure 4:
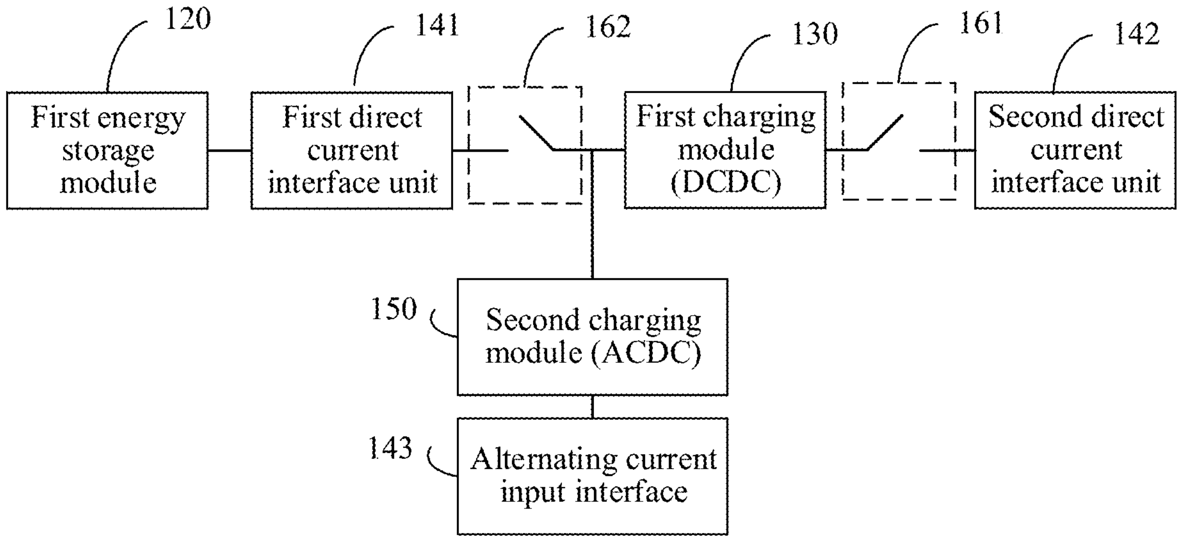
FIG. 4 is a diagram of a circuit module of an energy storage charging apparatus according to another embodiment of this application.

In at least one embodiment, as shown in FIG. 4, the charging apparatus further includes a control module (not shown in FIG. 4) and a switch module 160. The switch module 160 is connected to the control module and configured to receive a control signal from the control module, to switch on or switch off under the action of the control signal. The switch module 160 includes a loop switch 161. The loop switch 161 is arranged between the first charging module 130 and the second direct current interface unit 142, and is configured to control on-off of a loop from the first charging module 130 to the second direct current interface unit 142. The switch module 160 further includes a charging switch 162. The charging switch 162 has one end connected to the first direct current interface unit 141 and an other end connected to the first charging module 130 and the second charging module 150 respectively, and is configured to control the first energy storage module 120 to connect to the charging apparatus 110 or disconnect from the charging apparatus 110. Further, the control module is configured to detect a type of an input power supply of the charging apparatus, and controls on-off of the control loop switch 161 and on-off of the switching switch 162 according to the type of the input power supply, to switch an input power supply for charging the second energy storage module. The input power supply includes an external alternating current power supply and/or the first energy storage module 120. It should be noted that the first energy storage module 120 serves as an input power supply of the charging apparatus 110 in some embodiments and a power consumption apparatus receiving electrical energy through the charging apparatus 110 in some other embodiments.

When determining that both the alternating current power supply and the first energy storage module 120 are connected to the charging apparatus, the control module mainly controls the alternating current power supply to charge the second energy storage module. When having spare power, the alternating current power supply further charges the first energy storage module 120 in some embodiments. Specifically, in this embodiment, because the second energy storage module is a battery pack for a user to use, to avoid long-time waiting of the user for energy from affecting working efficiency, the control module responds to a requested charging power of the second energy storage module, and controls the alternating current power supply to charge the second energy storage module.

The control unit obtains the requested charging power of the second energy storage module, and determines whether the requested charging power of the second energy storage module is greater than a maximum output power of the second charging module 150. When the requested charging power of the second energy storage module is less than the maximum output power of the second charging module 150, the control module controls the charging switch 162 and the loop switch 161 to close simultaneously, and controls the alternating current power supply to charge the second energy storage module and the first energy storage module 120 simultaneously. Therefore, when having spare power in charging the second energy storage module, the alternating current power supply also charges the first energy storage module simultaneously in some embodiments, thereby maximizing use of the output power of the alternating current power supply and improving charging efficiency.

When the requested charging power of the second energy storage module is greater than the maximum output power of the second charging module 150, the control module controls the charging switch 162 and the loop switch 161 to close simultaneously, and controls the alternating current power supply to charge the first energy storage module 120 and the second energy storage module simultaneously. To be specific, when the requested charging power of the second energy storage module is greater than the maximum output power of the second charging module 150, because the alternating current power supply cannot satisfy a charging need of the second energy storage module, the control module controls the alternating current power supply and the first energy storage module 120 to charge the second energy storage module simultaneously. After the second energy storage module is fully charged, the control module controls the loop switch 161 to open and the charging switch 162 to close, to make the alternating current power supply to charge the first energy storage module 120.

When the requested charging power of the second energy storage module is equal to the maximum output power of the second charging module, the control module controls the loop switch 161 and the charging switch 162 to close sequentially, and controls the alternating current power supply to charge the second energy storage module and the first energy storage module 120 sequentially.

In some embodiments, a rated power quantity of the second energy storage module is less than a rated power quantity of the first energy storage module. Because the second energy storage module is a battery pack for a user to use, and the second energy storage module has a small rated power quantity and a high charging speed, the control module first controls the loop switch 161 to close and the charging switch 162 to open, to make the alternating current power supply to charge the second energy storage module first. After the second energy storage module is fully charged, the control module then controls the charging switch 162 to close and the loop switch 161 to open, to make the alternating current power supply to charge the first energy storage module 120.

Further, when determining that the input power supply includes only the first energy storage module 120, the control module controls the loop switch 161 and the charging switch 162 to close, to make the first energy storage module 120 to charge the second energy storage module. When determining that the input power supply includes only the alternating current power supply, the control module controls the loop switch 161 to close and the charging switch 162 to open, to make the alternating current power supply to charge the second energy storage module.

In another example, when the input power supply includes an external alternating current power supply, regardless of whether the input power supply includes the first energy storage module 120 in this case, the external alternating current power supply is used to charge the second energy storage module, to save power of the first energy storage module 120.

In at least one embodiment, the second energy storage module also charges the first energy storage module 120 through the first charging module 130 in some embodiments. That is, the first charging module 130 is a bidirectional DCDC charging module. The first energy storage module 120 charges the second energy storage module through the DCDC charging module in some embodiments, and the second energy storage module charges the first energy storage module 120 through the DCDC module in some other embodiments. In this embodiment, the second energy storage module may be a battery pack, or may be a self-travelling tool. In some embodiments, because the self-moving tool stores a large quantity of power, after work of the self-moving tool in a garden is completed, the first energy storage module 120 may be charged by using the self-moving tool.

Figure 6:
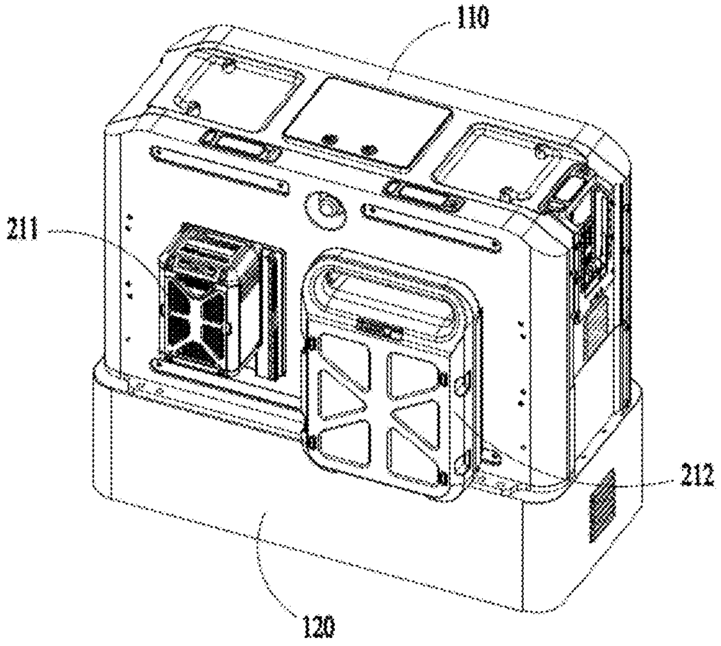
FIG. 6 is a schematic diagram of charging a second-capacity battery pack by plugging a first-capacity battery pack to a charging apparatus according to an embodiment of this application.

In at least one embodiment, as shown in FIG. 6, when the second energy storage module is a battery pack, the battery pack includes a first-capacity battery pack 211 and a second-capacity battery pack 212. A rated power quantity of the first-capacity battery pack 211 is greater than a rated power quantity of the second-capacity battery pack 212. The first-capacity battery pack 211 and the second-capacity battery pack 212 are both directly plugged to the second direct current interface unit 142 in some embodiments, to help the charging apparatus 110 to charge the first-capacity battery pack 211 or the second-capacity battery pack 212 when the charging apparatus 110 is connected to the direct current power supply or the alternating current power supply. In this embodiment, the first charging module 130 is further configured to convert electrical energy stored in the first-capacity battery pack 211, and charge the second-capacity battery pack 212.

Specifically, during outdoor working, the gardening team usually carries a plurality of first-capacity battery packs 211 with a large capacity and a plurality of second-capacity battery packs 212 with a small capacity. The rated power quantity of the first-capacity battery pack 211 is not less than 2 times the rated power quantity of the second-capacity battery pack 212. In some embodiments, the rated power quantity of the first-capacity battery pack 211 is 2 to 3 times the rated power quantity of the second-capacity battery pack 212. Since the rated power quantity of the second-capacity battery pack 212 is less than that of the first-capacity battery pack 211, correspondingly, a weight of the second-capacity battery pack 212 is also less than that of the first-capacity battery pack 211. Therefore, the first-capacity battery pack 211 is configured to be mounted with the lawn mower to supply power to the lawn mower, and the user does not need to directly burden the weight of the first-capacity battery pack 211. The second-capacity battery pack 212 is configured to be mounted with a handheld electrical tool such as a grass trimmer, a pruner, and a blower. After completing mowing by using a lawn mower, a user then completes other work by using a grass trimmer, a pruner, and a blower. When the power of the second-capacity battery pack 212 is exhausted, and the charging apparatus 110 is not connected to the first energy storage module 120 or the external alternating current power supply, the user also recharges the second-capacity battery pack 212 through the first-capacity battery pack 211 in some embodiments. In this case, the control module controls the charging switch 162 to open and the loop switch 161 to close, so that the first-capacity battery pack 211 can charge the second-capacity battery pack 212.

In at least one embodiment, the charging interface module further includes a third direct current interface unit. The third direct current interface unit is mainly used as a direct current input interface, and configured to connect an external direct current power supply, to charge the first energy storage module 120 and the second energy storage module through the external direct current power supply. Specifically, the external direct current power supply is a solar power supply in some embodiments. During outdoor working, the gardening team charges the first energy storage module 120, the battery pack, and the like by using the solar power supply, so that the gardening team can also recharge energy during daytime working. When energy is recharged by using an external direct current power supply, in some embodiments, in some embodiments, the external direct current power supply first charges the second energy storage module connected to the energy storage charging apparatus, and then charges the first energy storage module 120 after the second energy storage module is fully charged.

In at least one embodiment, the second charging module 150 is also directly connected to the charging interface module 140 in some embodiments, so that direct current electrical energy converted by the second charging module 150 is directly output to a charging interface. The charging interface is connected to an inverter in some embodiments. The direct current electrical energy is inverted by the inverter into alternating current electrical energy for an alternating current tool to use. Certainly, the second charging module 150 is not connected to the charging interface module 140 in some embodiments. An external inverter receives direct current electrical energy output by the first charging module 130 (DCDC) for inversion in some embodiments. However, compared with receiving electrical energy from the ACDC for inversion, when electrical energy from the DCDC is inverted, the electrical energy first passes through the ACDC and then passes through the DCDC, and an output power decreases. Therefore, in this embodiment, in some embodiments, by connecting to the charging interface by the ACDC, the external inverter directly receives direct current power output by the ACDC, to perform inversion.

The solution provided in the foregoing embodiment can be combined with any other embodiment. To be specific, the charging apparatus 110 provided in this application has a plurality of energy recharging manners, and not only can recharge energy for the first energy storage module 120 and a battery pack (that is, the second energy storage module) of an electrical tool through the alternating current power supply, but also can recharge energy for the battery pack of the electrical tool by using the first energy storage module 120, but also can recharge energy for a battery pack with a small capacity by using a battery pack with a large capacity, but also may recharge energy for the first energy storage module 120 and the battery pack of the electrical tool by using an external direct-current power supply, for example, solar energy, but also can supply power to an alternating current device of the user by providing alternating current electrical energy for connected external socket, so that user requirements in different scenarios are satisfied, and the user can also be relieved from anxiety about power consumption during using an electric tool outdoors.

Figure 5:
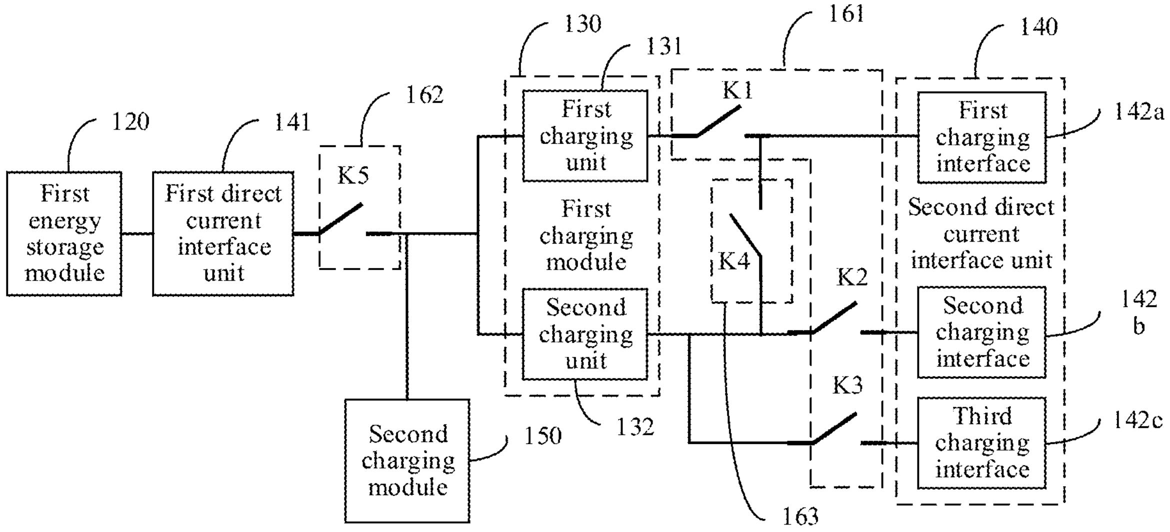
FIG. 5 is a diagram of a circuit module of an energy storage charging apparatus according to another embodiment of this application.

Further, to improve charging efficiency of the charging apparatus 110, the charging apparatus 110 is configured to charge a plurality of battery packs. As shown in FIG. 5, the first charging module 130 includes at least two charging units. The second direct current interface unit 142 includes at least two charging interfaces. Each charging unit has an input end connected to the first energy storage module 120 by the first direct current interface unit 141 and further connected to the second charging module 150, and an output end connected to at least one charging interface, so that the two charging units can charge the battery packs simultaneously or sequentially.

For example, the first charging module 130 includes two charging units. Each charging unit is connected to one charging interface, or each charging unit is connected to two charging interfaces respectively, or one of the charging units is connected to one charging interface, and the other of the charging units is connected to two charging interfaces. Alternatively, the first charging module 130 includes three charging units in some embodiments. Each charging unit is connected to one or more charging interfaces and the like. A quantity of charging units and a quantity of charging interfaces are set according to charging needs and a size of the energy storage charging apparatus 100 in some embodiments, and are not limited in this application.

In at least one embodiment, when one charging unit is connected to a plurality of charging interfaces, the plurality of charging interfaces are connected in parallel. At a time, the charging unit charges a second energy storage module connected to one of the charging interfaces. That is, the charging unit charges the connected second energy storage module in a time-sharing manner. Alternatively, when voltages of a plurality of second energy storage modules connected to the charging unit are the same, the charging unit charges the plurality of second energy storage modules simultaneously in some other embodiments. Alternatively, in some other embodiments, when voltages of a plurality of second energy storage modules connected to the charging unit are not the same, the charging unit first charges the plurality of second energy storage modules sequentially, to charge all the voltages of the plurality of second energy storage modules to a preset voltage, and then charges the plurality of second energy storage modules simultaneously until the plurality of second energy storage modules are fully charged. In this embodiment, to simplify charge control logic of the charging apparatus 110 while ensuring charging efficiency of the second energy storage module, when one charging unit is connected to a plurality of second energy storage modules, the charging unit charges the plurality of second energy storage modules in turn, so that one of the second energy storage modules can be fully charged at the highest speed, which is convenient for the user to use.

In this embodiment, each charging unit is a DCDC conversion unit, configured to convert direct current electrical energy stored in the first energy storage module 120 into direct current electrical energy required by the second energy storage module. Certainly, in another implementation, the charging unit is not limited to the DCDC conversion unit, and may alternatively be a direct current-alternating current conversion unit (that is, a DCAC conversion unit). Alternatively, the charging unit includes both a DCDC conversion unit and a DCAC conversion unit.

In a specific embodiment, as shown in FIG. 5, the first charging module 130 includes two charging units, namely, a first charging unit 131 and a second charging unit 132. The second direct current interface unit 142 includes three charging interfaces, namely, a first charging interface **142*ba*, a second charging interface 142*b*, and a third charging interface 142*c*. A quantity of loop switches 161 is the same as a quantity of charging interfaces. The loop switches 161 correspondingly include a first switch K1, a second switch K2, and a third switch K3. An output end of the first charging unit 131 is connected to a first charging interface 142*ba* by a loop switch K1, and an output end of the second charging unit 132 is connected to a second charging interface 142*b* and a third charging interface 142*c* by loop switches K2 and K3 respectively. The charging switch 162 includes a switch K5. An input end of the first charging unit 131 and an input end of the second charging unit 132 are both connected to the first energy storage module 120 by the switch K5. In this embodiment, the first switch K1, the second switch K2, the third switch K3, and the charging switch K5** are formed by two switch modules connected in parallel in some embodiments. Even if one of the switch module is short-circuited, the other of the switch modules can still normally open, to achieve double safety.

The first charging unit 131 and the second charging unit 132 are two independent charging units, which work in a time-sharing manner in some embodiments or work simultaneously in some other embodiments. When the first charging unit 131 and the second charging unit 132 work in a time-sharing manner, only after one of the charging units completes charging a second energy storage module connected thereto, the other of the charging units starts to charge a second energy storage module connected thereto. When the first charging unit 131 and the second charging unit 132 work simultaneously, the two charging units simultaneously charge one second energy storage module connected to each of the two charging units in some embodiments. That is, the energy storage charging apparatus 100 charges two second energy storage modules simultaneously. In this embodiment, by arranging a plurality of DCDC charging units, the energy storage charging apparatus can charge a plurality of second energy storage modules simultaneously when charging currents requested by the plurality of second energy storage modules are different.

In this embodiment, a maximum output power of a single charging unit is not less than 1.8 KW. For example, the maximum output power of the single charging unit is 1.8 KW, 2 KW, or 2.4 KW. In some embodiments, the maximum output power of the single charging unit is 3.6 KW. Because an output power of a single charging unit is large, fast charging of a battery pack can be supported. In addition, when working simultaneously, a plurality of charging units can perform fast charging for a plurality of battery packs simultaneously, to prevent waiting of a gardening team for energy during outdoor working from affecting work efficiency.

Further, when the charging apparatus 110 provided in this embodiment charges the second energy storage module, there are at least two charging modes, namely, a first charging mode (which is also a normal charging mode) and a second charging mode (which is also a fast charging mode). For a same second energy storage module, a maximum output power at an output end of the first charging module 130 in the first charging mode is less than a maximum output power at the output end of the first charging module 130 in the second charging mode. In other words, for the same second energy storage module, charged from an empty state (for example, an SOC is less than or equal to 5%) to a fully charged state (for example, the SOC is greater than or equal to 95%), a charging time required in the second charging mode is less than a charging time required in the first charging mode.

In at least one embodiment, the energy storage charging apparatus 100 further includes a human-computer interaction module. The human-computer interaction module is connected to the control module, and configured to receive a fast charging instruction delivered by a user. The fast charging instruction is used to instruct the energy storage charging apparatus to enter the second charging mode. When charging the second energy storage module, the control module switches between the first charging mode and the second charging mode according to an instruction from a user in some embodiments. In this application, a charging priority of the second charging mode is higher than a charging priority of the first charging mode. That is, when the human-computer interaction module does not receive the fast charging instruction, the control module controls the energy storage charging apparatus to enter the first charging mode. When the human-computer interaction module receives the fast charging instruction, the control module controls the energy storage charging apparatus to enter the second charging mode.

In the first charging mode, an output power of a single charging unit can satisfy a charging need of a battery pack. Therefore, the control module controls a single charging unit to charge a single battery pack correspondingly connected thereto. For example, the energy storage charging apparatus charges, through the first charging unit 131, a battery pack 200 connected to the first charging interface 142*ba*, and/or charges, in turn through the second charging unit 132, the battery pack 200 connected to the second charging interface 142*b* and the third charging interface 142*c*. In the first charging mode, a maximum output power output by a charging unit to a single charging interface is not less than 1.8 KW. For example, a maximum output power of a single second direct current interface unit 142 ranges from 1.8 KW to 3.6 KW. For example, the maximum output power is 1.8 KW, 2 KW, 2.4 KW, 3 KW, or 3.6 KW.

In the second charging mode, the control module obtains a requested charging power of the second energy storage module, and compares the requested charging power of the second energy storage module with a maximum output power of a single charging unit. When the requested charging power is less than or equal to the maximum output power of the single charging unit, an output power of the single charging unit can satisfy a fast charging need of the battery pack, and the control module controls the single charging unit to charge the second energy storage module. When the requested charging power is greater than the maximum output power of the single charging unit, only a sum of output powers of a plurality of charging units can satisfy the fast charging need. In this case, the control module controls at least two charging units to be connected in parallel to charge the single second energy storage module.

Further, the switch module 160 further includes a switching switch 163. The switching switch 163 is arranged between two adjacent charging units. One end of the switching switch 163 is connected to a joint between the charging unit and a charging interface correspondingly connected to the charging unit. An other end of the switching switch 163 is connected to a joint between the other charging unit and a charging interface correspondingly connected to the other charging unit. That is, as shown in FIG. 5, a switching switch K4 has one end connected to an output end of the first charging unit 131 and an other end connected to an output end of the second charging unit 132, and is configured to control a connection relationship between the first charging unit 131 and the second charging unit 132. When the switching switch K4 is closed, an output end of the first charging unit 131 and an output end of the second charging unit 132 are connected to each other, so that two adjacent charging units are connected in parallel. When the switching switch K4 is open, output ends of two adjacent charging units are disconnected. Therefore, the control module determines, according to the requested charging power of the battery pack in the second charging mode, whether to control the switching switch 163 to close in some embodiments. When the requested charging power of the battery pack is less than or equal to a maximum output power output by a single charging unit, the control module controls the switching switch 163 to close, to close the at least two charging units. When the requested charging power of the battery pack is greater than the maximum output power output by the single charging unit, the control module controls the switching switch 163 to open, so that the output ends of the at least two charging units are disconnected. Each charging unit respectively charges a correspondingly connected battery pack.

For example, this embodiment provides two battery packs, namely, a first-capacity battery pack 211 and a second-capacity battery pack 212. A rated capacity of the first-capacity battery pack 211 is less than a rated capacity of the second-capacity battery pack 212. Because rated capacities of battery packs are different, charging powers required by the battery packs are also different at a same charging rate. A requested charging power of the small-capacity battery pack in the second charging mode is less than a requested charging power of the large-capacity battery pack in the second charging mode. For example, in the second charging mode, a requested charging power of the first-capacity battery pack 211 is 6 KW, and a requested charging power of the second-capacity battery pack 212 is 2.4 KW. In this embodiment, an output power of a single charging unit is 3.6 KW. Therefore, in the second charging mode, when the requested charging power received by the control module is 6 KW, the control module controls the switching switch 163 to close, to make the first charging unit 131 and the second charging unit 132 to be connected in parallel to charge the first-capacity battery pack 211 connected to the first charging interface 142*ba*. Therefore, an output power of the first charging interface 142*ba* is a sum of an output power of the first charging unit 131 and an output power of the second charging unit 132. Because the output power of the charging interface is large, correspondingly, a charging speed for charging the battery pack 200 is high and a charging time is shorted, so that fast charging is implemented. When the requested charging power received by the control module is 2.4 KW, the control module controls a single charging unit to charge the battery pack. In the foregoing embodiment, descriptions are provided by using only an embodiment in which the switching switch includes one switch. In an actual solution, when there are a plurality of charging units, there is also more than one switching switch in some embodiments. For example, when there are n charging units (n is an integer greater than 2), there are at most n−1 switching switches in some embodiments.

It may be understood that in the second charging mode, a quantity of charging units connected in parallel is selected according to a requested charging power of a battery pack in some embodiments, and is not limited to two.

In at least one embodiment, in the second charging mode, a maximum output power output by the first charging module 130 is not less than 3.6 KW. For example, the maximum output power output by the first charging module 130 may be 3.6 KW, 4 KW, 4.8 KW, 6 KW, 7.2 KW, or the like. An output power of the first charging module 130 is a sum of output powers of a plurality of charging units that are in the first charging module and that participate in charging the battery pack. In a specific embodiment, in the first charging mode, an output power output by the first charging module 130 to a single second direct current interface unit 142 is 3.6 KW, and in the second charging mode, the output power output by the first charging module 130 to the single second direct current interface unit 142 is 7.2 KW. In the first charging mode, for a 0.2 KWH battery pack, the energy storage charging apparatus can fully charge the battery pack within 8 to 15 minutes, and charge an empty battery pack to 80% of a rated power quantity of the battery pack within 5 to 12 minutes. For a 0.6 KWH battery pack, the energy storage charging apparatus can fully charge the battery pack within 13 to 25 minutes, and charge an empty battery pack to 80% of a rated power quantity of the battery pack within 9 to 22 minutes. In the fast charging mode, for a 0.2 KWH battery pack, the charging apparatus can fully charge the battery pack within 4 to 7 minutes, and for a 0.6 KWH battery pack, the charging apparatus can fully charge the battery pack within 8 to 15 minutes. Therefore, when a gardening team urgently needs to use a battery pack, the fast charging mode can be enabled, to reduce a waiting time for power consumption.

In the foregoing at least one embodiment, by providing two charging modes, the fast charging mode is enabled in some embodiments when a user urgently needs to use the battery pack, and the normal charging mode is enabled in some other embodiments when the user does not urgently need to use power, to satisfy usage needs of the user in different scenarios.

Further, in the second charging mode, a specific charging interface on the energy storage charging apparatus is preset as a charging interface in the second charging mode in some embodiments. When a specific charging interface is specified as a fast charging interface, if the control module detects that no battery pack 210 is mounted with the specified charging interface, and a battery pack 210 is mounted with another charging interface, even if the control module receives a fast charging instruction, the control module still does not enable the fast charging mode. Certainly, alternatively, no specific interface is preset as a fast charging interface, and instead, a user specifies the fast charging interface. For example, while delivering a fast charging instruction, the user specifies one of the charging interfaces as the fast charging interface through the human-computer interaction module. After receiving the fast charging instruction and the corresponding information of indicating the fast charging interface, the charging apparatus 110 performs fast charging for the battery pack 210 connected to the charging interface. Alternatively, when there are three charging interfaces on the charging apparatus 110, and only one of the charging interfaces has the battery pack 210 mounted thereon, after the user delivers a fast charging instruction, the charging apparatus 110 identifies the charging interface to which the battery pack 210 is connected, uses the interface as the fast charging interface, and performs fast charging for the battery pack 210 connected to the charging interface.

As described above, the charging apparatus 110 in this embodiment has three charging interfaces. In a specific embodiment, the first charging interface 142*ba* is set as a charging interface in the second charging mode, and is identified at a corresponding interface on an object, for the user to perform identification, in some embodiments. In addition, the first charging interface 142*ba* may also be used as an interface for the first charging mode. To be specific, a charging interface in the second charging mode is the first charging interface 142*ba*, and charging interfaces in the first charging mode are the first charging interface 142*ba*, the second charging interface 142*b*, and the third charging interface 142*c*. When the user delivers a fast charging instruction and does not specify a fast charging interface, the charging apparatus 110 perform fast charging for a battery pack connected to the first charging interface 142*ba*.

As shown above, the charging apparatus 110 includes a human-computer interaction module, configured to receive the fast charging instruction, to make the control module to enter the second charging mode according to the fast charging instruction. Further, when receiving the fast charging instruction, instead of immediately controlling the charging apparatus to enter the second charging mode, the control module further obtains information about an input power supply, and determines, according to the information about the input power supply, whether the charging apparatus is allowed to enter the second charging mode.

Specifically, since a charging power output by a single charging interface is large in the second charging mode, fast charging can be performed only when a power of the input power supply is greater than a charging power required by the battery pack in the second charging mode. In this embodiment, when the input power supply is an alternating current power supply, the control module prohibits the charging apparatus from entering the second charging mode. When the input power supply includes the first energy storage module 120, for example, the input power supply is the first energy storage module 120, or the input power supply is the first energy storage module 120 and the alternating current power supply, the control module obtains status information of the first energy storage module 120, and determines, based on the status information of the first energy storage module 120, whether the energy storage charging apparatus is allowed to enter the second charging mode. The status information of the first energy storage module 120 includes a remaining power quantity and a temperature of the first energy storage module 120. When the remaining power quantity of the first energy storage module 120 is less than a preset power quantity, the control module prohibits the energy storage charging mode from entering the second charging mode. When the remaining power quantity of the first energy storage module 120 is greater than or equal to the preset power quantity, the control module further determines whether a temperature of the first energy storage module 120 satisfies a preset temperature condition. When the temperature of the first energy storage module satisfies the preset temperature condition, the energy storage charging apparatus is allowed to enter the second charging mode. Otherwise, the energy storage charging apparatus is prohibited from entering the second charging mode. The preset power quantity is 10%, 15%, or 20% of a rated power quantity of the first energy storage module 120 in some embodiments, and is specifically selected based on the rated power quantity of the first energy storage module in some embodiments.

In another embodiment, when the input power supply includes the first energy storage module 120, the control module obtains not only status information of the first energy storage module 120, but also status information of the battery pack. Only when both the status information of the first energy storage module 120 and the status information of the battery pack satisfy preset conditions, the energy storage charging apparatus is allowed to enter the second charging mode. Specifically, the status information of the first energy storage module 120 includes a remaining power quantity of the first energy storage module 120 and a battery temperature of the first energy storage module 120. The status information of the battery pack includes a temperature of the battery pack. When the remaining power quantity of the first energy storage module 120 is greater than or equal to the preset power quantity, the battery temperature of the first energy storage module 120 satisfies a first preset temperature condition, and the temperature of the battery pack satisfies a second preset temperature condition, the energy storage charging apparatus is allowed to enter the second charging mode. Otherwise, the energy storage charging apparatus is prohibited from entering the second charging mode.

In at least one embodiment, in the first charging mode, a plurality of charging units of the first charging module 130 work simultaneously in some embodiments or work in a time-sharing manner in some other embodiments. Further, when determining that charging interfaces corresponding to at least two charging units are each connected to a second energy storage module, the control module is further configured to obtain information about an input power supply, and control, according to the information about the input power supply, the at least two charging units to charge the second energy storage modules simultaneously or sequentially.

When the input power supply is an alternating current power supply, the control module controls the at least two charging units to charge the second energy storage modules simultaneously, to make the plurality of second energy storage modules to be fully charged as simultaneously as possible. When the input power supply includes the first energy storage module 120, and a remaining power quantity of the first energy storage module 120 is less than a preset power quantity, the control module controls the at least two charging units to charge the second energy storage modules sequentially. When the input power supply is the first energy storage module 120, and the remaining power quantity of the first energy storage module 120 is greater than or equal to the preset power quantity, the control module controls the at least two charging units to charge the second energy storage modules simultaneously.

Further, in the first charging mode, a maximum output power output by each charging unit to a single charging interface when a plurality of charging units work simultaneously is less than or equal to a maximum output power output by each charging unit to a single charging interface when the plurality of charging units work sequentially.

Specifically, a maximum output power output by each charging unit to a single charging interface when a plurality of charging units work simultaneously is not less than 1.8 KW. A maximum output power output by each charging unit to a single charging interface when the plurality of charging units work sequentially is not less than 3 KW. For example, a maximum output power output by each charging unit to a single charging interface when a plurality of charging units work simultaneously is 1.8 KW or 2.4 KW in some embodiments, and a maximum output power output by each charging unit to a single charging interface when the plurality of charging units work sequentially is 3 KW in some embodiments. Alternatively, a maximum output power output by each charging unit to a single charging interface when a plurality of charging units work simultaneously is 3 KW in some embodiments, and a maximum output power output by each charging unit to a single charging interface when the plurality of charging units work sequentially is 3.6 KW in some embodiments. Alternatively, a maximum output power output by each charging unit to a single charging interface when a plurality of charging units work simultaneously is 3.6 KW in some embodiments, and a maximum output power output by each charging unit to a single charging interface when the plurality of charging units work sequentially is 3.6 KW in some embodiments.

In the first charging mode, when determining that a plurality of charging interfaces connected to a single charging unit are connected to at least two second energy storage modules, the control module is further configured to obtain information about the plurality of second energy storage modules and information about the input power supply, and charge the plurality of second energy storage modules and the first energy storage module according to a preset priority based on the information about the second energy storage modules and the information about the input power supply.

Figure 7:
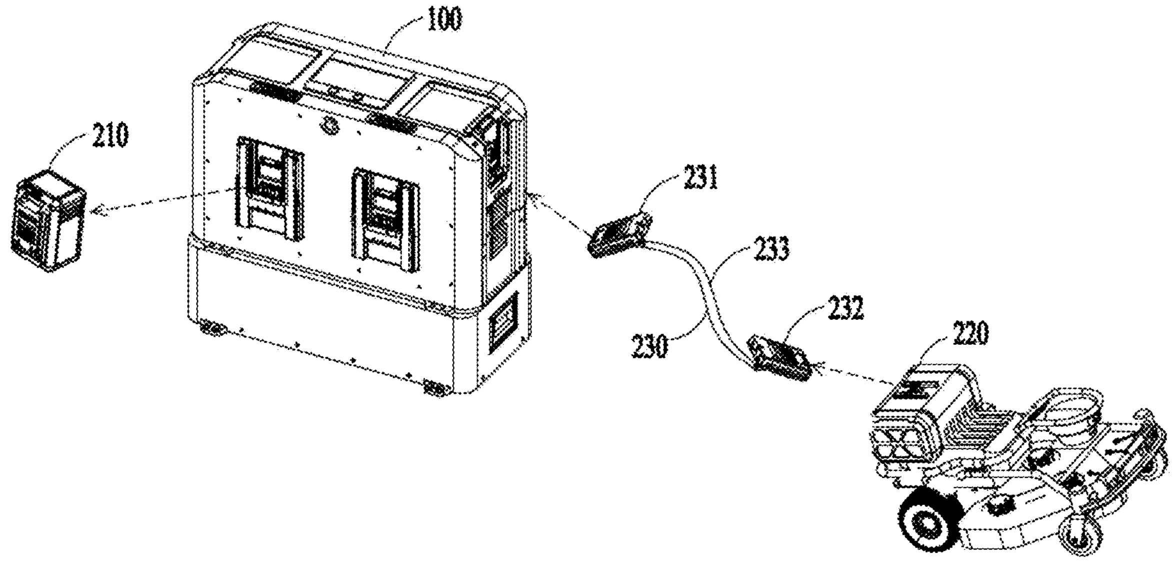
FIG. 7 is a schematic diagram of a scenario in which an energy storage charging apparatus charges a battery pack and charges a self-moving tool through an adapter according to an embodiment of this application.

Specifically, in this embodiment, as shown in FIG. 7, the second energy storage module includes a battery pack 210 and a self-moving tool 220. The battery pack 210 is configured to be detachably mounted with the electrical tool, to supply power to the electrical tool. The self-moving tool 220 has a built-in battery, configured for the self-moving tool to walk and work. When the charging apparatus charges the battery pack 210, the battery pack 210 is directly plugged to a charging interface in some embodiments. When charging the self-moving tool 220, the charging apparatus charges the self-moving tool 220 through an adapter 230 in some embodiments. The adapter 230 has one end connected to a first direct current interface unit of the charging apparatus and an other end connected to a charging interface of the self-moving tool 220. It may be understood that the charging apparatus charges not only the self-moving tool through the adapter, but also another energy storage tool through the adapter in some embodiments. In this application, only an energy storage self-moving tool is used as an example.

The control module determines whether the second energy storage module connected to the charging interface module includes the battery pack 210 and the self-moving tool 220. When the second energy storage module includes the battery pack 210 and the self-moving tool 220, the control module determines whether the input power supply includes the alternating current power supply. When the input power supply includes the alternating current power supply, a charging priority of the battery pack 210 is higher than a charging priority of the first energy storage module 120, and the charging priority of the first energy storage module 120 is higher than a charging priority of the self-moving tool 220. That is, the control module controls the charging apparatus 110 to first charge the battery pack 210, then charge the first energy storage module 120 after the battery pack 210 is fully charged, and charge the self-moving tool after the first energy storage module 120 is fully charged. When the control module determines that the input power supply does not include the alternating current power supply, the charging priority of the battery pack 210 is higher than the charging priority of the self-moving tool 220. Generally, a scenario in which there is an alternating current power supply is a scenario in which the gardening team returns indoors at night to perform recharging. In a case of night-time recharging, the control module controls the alternating current power supply to charge the battery pack, so that the gardening team can carry the fully charged battery pack to work during the day, then charge the first energy storage module 120, so that the gardening team can carry the fully charged first energy storage module 120 to recharge energy for the battery pack during the day, and finally charge the self-moving tool. A scenario in which no alternating current power supply is connected is usually a scenario of working outdoors during the day. In this case, the charging apparatus 110 charges the battery pack and the self-moving tool through the first energy storage module 120. Since a rated capacity of the battery pack is less than a rated capacity of the self-moving tool, the battery pack has a high charging speed. To prevent the user from waiting, the battery pack is charged.

In another embodiment, when no alternating current power supply is connected, to enable the self-moving tool 220 to be fully charged to work, the user further delivers a priority charging instruction through the human-computer interaction module in some embodiments, to instruct the charging apparatus 110 to charge the self-moving tool.

Specifically, a power quantity stored in the self-moving tool is not less than 5 KWh. For example, a power quantity stored in the self-moving tool is 5 KWh, 7 KWh, or 10 KWh. In some embodiments, the power quantity stored in the self-moving tool is 7.7 KWh. Because a capacity of the self-moving tool is large, it is difficult to fast fully charge the self-moving tool in a short time. When delivering the priority charging instruction, the user instructs the charging apparatus to charge the self-moving tool to a specified power quantity in some embodiments. When the human-computer interaction module receives the priority charging instruction, the control module charges the self-moving tool 220 to a specified power quantity, and then charges the battery pack 210. After the battery pack is fully charged, if detecting that the self-moving tool is still connected to the charging apparatus 110, the control module controls the charging apparatus 110 to continue to charge the self-moving tool 220, to fully charge the self-moving tool 220. When the human-computer interaction module does not receive the priority charging instruction, the control module first charges the battery pack 210, so that the user can first work using the fully charged battery pack 210. After the battery pack 210 is fully charged, the control module then controls the energy storage charging apparatus to charge the energy storage self-moving tool 220.

In at least one embodiment, when the charging apparatus charges a plurality of battery packs, the control module obtains digital communication manners of the plurality of battery packs, and controls, according to the digital communication manners, a sequence of charging the plurality of battery packs.

In this embodiment, the charging interface of the charging apparatus includes at least two types of digital communication terminals, configured to communicate with battery packs of different digital communication types respectively. Correspondingly, at least two types of digital communication modules are included in the charging apparatus and configured to connect to two types of digital communication terminals respectively. Specifically, the digital communication terminals of the charging apparatus include at least a controller area network (CAN) communication terminal and a serial communication terminal, configured to communicate with a battery pack with CAN communication and a battery pack with serial communication respectively.

In this embodiment, when communicating with the battery packs, the charging apparatus 110 performs digital communication with the battery packs through the CAN communication terminal. When the CAN communication fails, the charging apparatus 110 performs digital communication with the battery packs through the serial communication terminal. The control module identifies communication types of the battery packs through the communication terminals, and controls charging priorities of the plurality of battery packs according to the communication types. That is, the battery packs of different digital communication types have different priorities of being charged. Specifically, when identifying a differential communication terminal, the control module controls the charging apparatus 110 to charge a second energy storage module with a differential communication terminal, and then charges a second energy storage module with serial communication terminal after the second energy storage module with the differential communication terminal is fully charged.

Further, when the digital communication types of the plurality of battery packs are the same, the control module identifies a plugging sequence of the plurality of battery packs through communication, and controls, according to the plugging sequence of the battery packs, a sequence of charging the battery packs by a single charging unit. A charging priority of a battery pack 210 plugged earlier is higher than a charging priority of a battery pack 210 plugged later. When the plurality of battery packs 210 have a same plugging sequence (for example, the plurality of battery packs 210 are first plugged to the energy storage charging apparatus, and then the energy storage charging apparatus is powered up), the control module controls the sequence of charging according to remaining power quantities of the plurality of battery packs 210. A charging priority of a battery pack 210 with a high remaining power quantity is higher than a charging priority of a battery pack 210 with a low remaining power quantity. Certainly, in some embodiments, the control module alternatively first controls the sequence of charging the plurality of battery packs 210 according to the remaining power quantities of the plurality of battery packs 210, and then controls the sequence of charging the plurality of battery packs 210 according to the plugging sequence of the plurality of battery packs 210 when the remaining power quantities of the plurality of battery packs 210 are the same.

It may be understood that through communication with the battery pack, the control module identifies a type of the second energy storage module and obtains a plugging sequence of the battery pack and a remaining power quantity of the second energy storage module in some embodiments.

In at least one embodiment, the battery pack 200 is directly plugged to a charging interface of the charging apparatus to obtain electrical energy in some embodiments, or is connected to the charging interface of the charging apparatus by a cable in some other embodiments. An actual output power output by the charging interface when the battery pack 200 is plugged to the charging interface of the charging apparatus is greater than an actual output power output when the battery pack 200 is connected to the charging apparatus by the cable.

Figure 8:
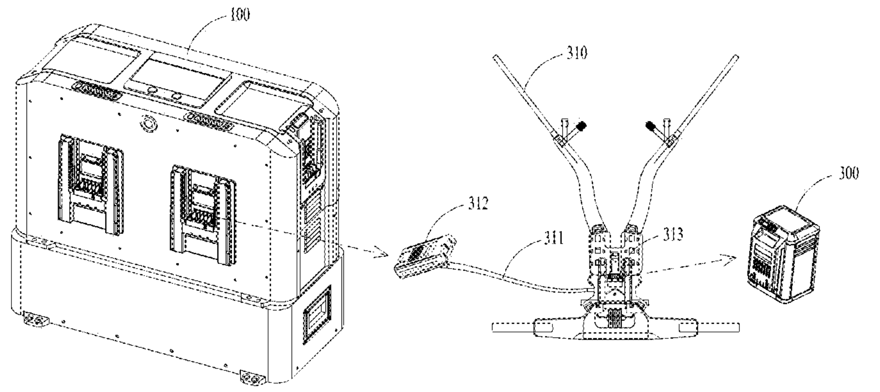
FIG. 8 is a schematic diagram of a scenario in which an energy storage charging apparatus charges a battery pack through a piggyback apparatus according to an embodiment of this application.

As shown in FIG. 8, when the battery pack 210 is connected to the charging apparatus by the cable, the battery pack 210 is mounted with a piggyback apparatus 310, and is connected to the charging apparatus by the piggyback apparatus 310. The piggyback apparatus 310 has a battery pack mounting position, and the battery pack 200 is detachably mounted with the battery pack mounting position of the piggyback apparatus 310. The piggyback apparatus 310 further includes a cable 311 and a first interface 312. A shape and a size of the first interface 312 are both the same as a shape and a size of a charging/discharging interface of the battery pack 200, so that the first interface 312 can be plugged to any charging/discharging interface of the charging apparatus, to enable the charging apparatus to charge the battery pack through the cable.

A charging power of the charging apparatus charging the battery pack through the cable is less than a charging power of the charging apparatus charging the battery pack 200 directly plugged to the charging apparatus 100. The reason is that, generally, when the battery pack is mounted with the piggyback apparatus 310 to supply power to the electrical tool, the user carries the piggyback apparatus 310 on the back, and the piggyback apparatus 310 is connected to the electrical tool by the cable 311 and the first interface 312. If the charging apparatus 100 increases a charging power when charging the battery pack 200 through the piggyback apparatus 310, an overcurrent capability of the cable also needs to be correspondingly increased, which tends to cause the cable to become thicker and cause inconvenience to the user during piggyback and use.

Further, in this application, a structure of a charging/discharging terminal of an interface of the battery pack and a structure of a charging/discharging terminal of an interface of the cable are set to be different, so that the charging apparatus 100 can identify whether a charging type of the battery pack is cable charging or direct plug charging.

Specifically, a charging pole piece is arranged at a charging interface of the charging apparatus 110. A charging interface of the battery pack 220 is provided with an interface slot. A charging contact is arranged in each interface slot. When the battery pack 210 is plugged to the charging apparatus 110, a charging pole piece of the charging apparatus 110 is inserted into an interface slot of the battery pack 210 and connected to a charging contact in a one-to-one correspondence in some embodiments. The first interface 312 of the piggyback apparatus 310 is also provided with an interface slot, and a quantity of interface slots of the first interface 312 is the same as a quantity of interface slots of the charging interface of the battery pack. When the first interface 312 is plugged to the charging apparatus 110, a charging pole piece of the charging apparatus 110 is inserted into an interface slot of the first interface 312 in some embodiments.

Figure 9:
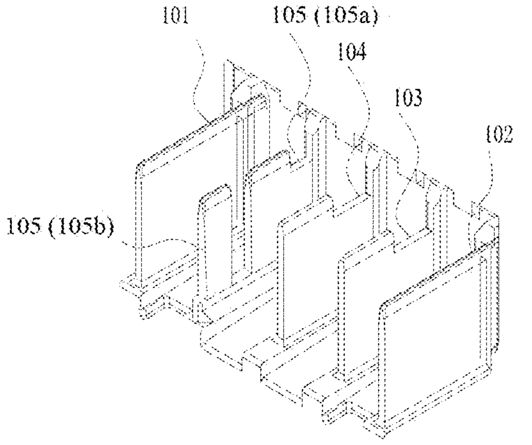
FIG. 9 is a diagram of terminal arrangement of a charging interface of an energy storage charging apparatus and a charging interface of a charger according to an embodiment of this application.

Specifically, as shown in FIG. 9, the charging pole piece of the charging apparatus 110 includes a positive pole piece 101, a negative pole piece 102, an analog signal communication pole piece 103, a first digital signal communication pole piece 104, and a second digital signal communication pole piece 105. In other words, the charging apparatus 100 has two digital communication manners, and can communicate with two different types of second energy storage modules. In this embodiment, a communication type of the first digital signal communication pole piece 104 is serial communication, and a communication type of the second digital signal communication pole piece 105 is differential communication. Specifically, the differential communication is controller area network (CAN) communication in some embodiments. The second digital signal communication pole piece 105 includes two inserts 105*a* and 105*b*. The insert 105*a* and the insert 105*b* are independent of each other and insulated from each other, and on a plane perpendicular to a direction of a plug in the battery pack. The projections of the insert 105*a* and the insert 105*b* are overlap. When communicating with the second energy storage module, the charging apparatus 100 performs digital communication with the second energy storage module through the second digital communication pole piece 105, and performs, when the second digital signal communication fails, digital communication with the second energy storage module by using the first digital signal communication pole piece 104.

Figure 10:
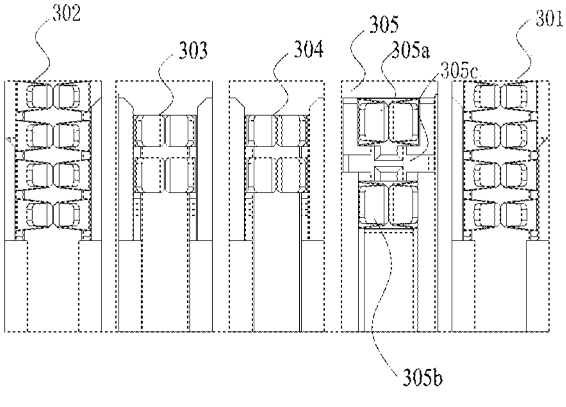
FIG. 10 is a diagram of terminal arrangement of a charging interface of a battery pack according to an embodiment of this application.

Correspondingly, as shown in FIG. 10, the charging interface of the battery pack 210 provided in this embodiment includes a positive contact 301, a negative contact 302, an analog signal communication contact 303, a first digital signal communication contact 304, and a second digital signal communication contact 305. In this embodiment, a communication type of the first digital signal communication contact 304 is serial communication, and a communication type of the second digital signal communication contact 305 is differential communication. Specifically, the differential communication is CAN communication in some embodiments. The second digital signal communication contact 305 includes two independent contacts, namely, a contact 305*a* and a contact 305*b*. The contact 305*a* and the contact 305*b* are arranged in a same terminal slot, and an insulation member is arranged between the contact 305*a* and the contact 305*b*. In a direction perpendicular to a direction of plugging/unplugging the battery pack, the contact 305*a* and the contact 305*b* are arranged front and rear, and projections of the contact 305*a* and the contact 305*b* overlap with each other. When the battery pack 210 is directly plugged to the charging interface of the charging apparatus 110, the positive pole piece 101, the negative pole piece 102, the analog signal communication pole piece 103, the first digital signal communication pole piece 104, and the second digital signal communication pole piece 105 are respectively docked with the positive contact 301, the negative contact 302, the analog signal communication contact 303, the first digital signal communication contact 304, and the second digital signal communication contact 305. The charging apparatus 100 first activates the battery pack through the analog signal communication pole piece 303, and then performs digital signal communication with the battery pack 200 through the second digital signal communication pole piece 105. When the communication succeeds, the charging apparatus 100 identifies that the battery pack is connected in a direct plugging manner.

Figure 11:
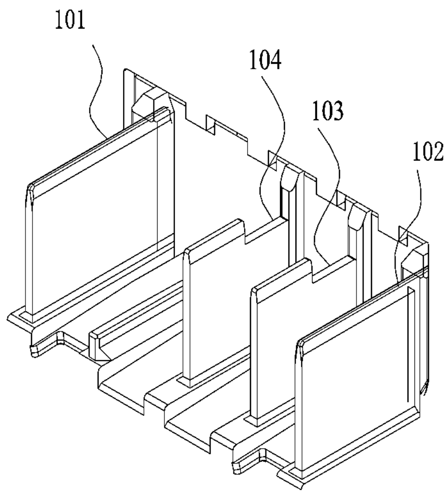
FIG. 11 is a diagram of terminal arrangement of an interface of a battery pack on a body of a piggyback apparatus and an interface of a battery pack on an electrical tool according to an embodiment of this application.
Figure 12:
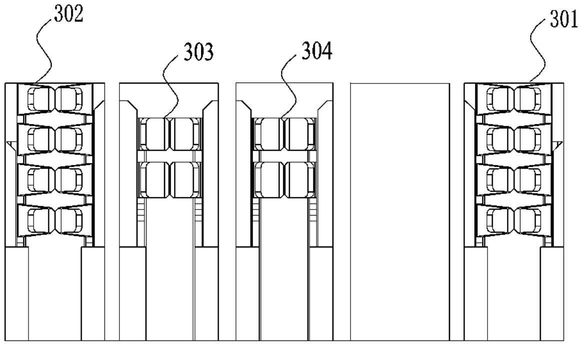
FIG. 12 is a diagram of terminal arrangement of an interface of a cable of a piggyback apparatus according to an embodiment of this application.

As shown in FIG. 8, a second interface 313 is arranged on a body of the piggyback apparatus 310 provided in this embodiment. The second interface 313 is configured to mate with the battery pack 210. The piggyback apparatus 310 is further connected to the first interface 312 by the cable 311. The first interface 312 is configured to mate with the charging interface of the charging apparatus 100. As shown in FIG. 11, the second interface 313 has four types of pole pieces, namely, a positive pole piece 101, a negative pole piece 102, an analog signal communication pole piece 103, and a first digital signal communication pole piece 104. When the battery pack 210 is mounted with the charging apparatus, the positive pole piece 101, the negative pole piece 102, the analog signal communication pole piece 103, and the first digital signal communication pole piece 104 of the second interface 313 are respectively connected to the positive contact 301, the negative contact 302, the analog signal communication contact 303, and the first digital signal communication contact 304 on the battery pack in a one-to-one correspondence. The second digital signal communication contact 305 on the battery pack is not connected. As shown in FIG. 12, the first interface 312 of the piggyback apparatus includes four types of charging contacts, including a positive contact 301, a negative contact 302, an analog signal communication contact 303, and a first digital signal communication contact 304 respectively. That is, charging contacts are arranged in only four of five interface slots of the first interface 312, and one interface slot is vacant and the first interface 312 includes only one type of digital signal communication terminal. When the first interface 312 of the piggyback apparatus 310 is plugged to the charging interface of the charging apparatus 100, the positive pole piece 101, the negative pole piece 102, the analog signal communication pole piece 103, and the first digital signal communication pole piece 104 are respectively connected to the positive contact 301, the negative contact 302, the analog signal communication contact 303, and the first digital signal communication contact 304 in a one-to-one correspondence, and the second digital signal communication pole piece 105 is inserted into the vacant interface slot. When the charging apparatus 100 first communicates with the battery pack on the piggyback apparatus through the second digital signal communication pole piece 105, since the second digital signal communication pole piece 105 is inserted into the vacant interface slot, wherein there is no electrical connection, and therefore, there is no communication signal. In this case, the charging apparatus 100 then communicates with the battery pack on the piggyback apparatus through the first digital signal communication pole piece 104. In this case, if the communication succeeds, the charging apparatus can identify that the current charging interface is connected to a cable output interface of the piggyback apparatus.

In other words, a quantity and types of digital signal communication terminals of the interface of the battery pack are set different from a quantity and types of digital signal communication terminals of the interface of the piggyback apparatus 310, so that when the battery pack 210 and the first interface 310 of the piggyback apparatus 310 are plugged to the charging apparatus 110, different digital communication types enable the charging apparatus 110 to identify whether a connection manner of the battery pack is a direct plugging type or a cable type, thereby outputting different charging powers.

As shown in FIG. 7, in at least one embodiment, when the charging apparatus 100 charges the self-moving tool 220, because the built-in battery in the self-moving tool 220 stores a large power quantity, and correspondingly, has a large volume and a large weight, the user usually cannot remove the built-in battery from a housing by himself or herself. Based on this, this application provides an adapter 230, configured to connect the charging apparatus 110 and the self-moving tool 220, so that the charging apparatus 110 can transmit electrical energy to the self-moving tool 220 through the adapter 230. The adapter 230 has a first interface 231, a second interface 232, and a first cable 233 connecting the first interface 231 and the second interface 232. The first interface 231 is configured to mate with a charging interface of the charging apparatus 110, and the second interface 232 is configured to mate with a charging interface of the self-moving tool 220. In this embodiment, any interface on the charging apparatus 110 is connectable to the first interface 231 to transmit electrical energy in some embodiments. Certainly, one of the interfaces is specified as a dedicated interface of the self-moving tool 400 in some other embodiments. In a specific example, the third charging interface 142*c* on the charging apparatus 110 is specified as a dedicated interface of the self-moving tool 220 in some embodiments. That is, when the first interface 231 is inserted into the third charging interface 233, the charging apparatus 110 outputs direct current electricity through the second charging unit 132, and transmits electrical energy to the self-moving tool 220 through the third charging interface 233 and the first interface 231 in some embodiments.

Further, interface structures and terminals of the first interface 231 and the second interface 232 are the same, and the interface structures and terminals of the first interface 231 and the second interface 232 are all the same as interface structures and terminals of the battery pack. As shown in FIG. 10, the first interface 231 and the second interface 232 each includes a positive contact 301, a negative contact 302, a first analog signal communication contact 303, a first digital signal communication contact 304, and a second digital signal communication contact 305. A communication type of the first digital signal communication contact 304 is serial communication, and a communication type of the second digital signal communication contact 305 is differential communication. The charging apparatus 110 performs digital signal transmission with the self-moving tool 220 through serial communication or through differential communication in some embodiments. In some embodiments, digital signal transmission is performed between the charging apparatus 100 and the self-moving tool through differential communication.

Figure 13:
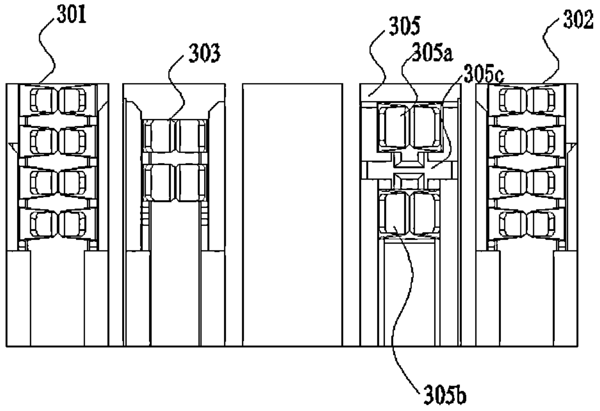
FIG. 13 is a diagram of terminal arrangement of a charging/discharging interface on a body of an energy storage self-moving tool according to an embodiment of this application.

In another example, as shown in FIG. 13, the first interface 231 and the second interface 232 each include a positive contact 301, a negative contact 302, a first analog signal communication contact 303, and a second digital signal communication contact 305. A communication type of the second digital signal communication contact 305 is differential communication. The second digital signal communication contact 305 includes two independent contacts, namely, a contact 305*a* and a contact 305*b*, as shown in FIG.

13. The contact 305*a* and the contact 305*b* are insulated from each other. In a direction perpendicular to a direction of plugging or unplugging the first interface 231 or the second interface 232, the contact 305*a* and the contact 305*b* are arranged up and down in a same interface slot. In addition, in a region defined by the interface slot, projections of the contact 305*a* and the contact 305*b* at least partially overlap. Widths of the contact 305*a* and the contact 305*b* are different from widths of the first analog signal communication contact 303. That is, the self-moving tool 220 can perform digital signal communication with the charging apparatus only through differential communication.

In conclusion, when the charging apparatus 110 communicates with the second energy storage module through different digital signal terminals, charging powers output by the charging apparatus 110 are also different. In this embodiment, a charging power output by the charging apparatus 110 when the charging apparatus 110 communicates with the second energy storage module through differential communication is different from a charging power output by the charging apparatus 110 when the charging apparatus 110 communicates with the second energy storage module through serial communication in some embodiments. Specifically, when the charging apparatus 100 communicates with the second energy storage module through differential communication, the charging apparatus 110 obtains a charging power required by the second energy storage module by communicating with the second energy storage module, and controls an output power based on a communication result. When the charging apparatus 110 communicates with the second energy storage module through serial communication, the output power is limited to be less than or equal to 3.6 KW. In some embodiments, in this embodiment, an output power of the charging apparatus 110 in communicating with the second energy storage module through differential communication is different from an output power of the charging apparatus 110 in communicating with the second energy storage module through serial communication. In a specific example, when the charging apparatus 110 communicates with the second energy storage module through differential communication, the output power is 3.6 KW, and when the charging apparatus 110 communicates with the second energy storage module through serial communication, the output power is 2.4 KW.

The foregoing charging apparatus can charge the second energy storage module by using not only a direct current power supply, but also an alternating current power supply. Carrying a direct current power supply to charge the second energy storage module can relieve the gardening team from anxiety about power consumption during outdoor working. In a scenario in which there is an alternating current power supply, the second energy storage module is charged by using the alternating current power supply in some embodiments, so that recharging manners are diversified, a time of waiting energy is reduced, and working efficiency is improved.

As shown in FIG. 1, an embodiment of this application provides an energy storage charging apparatus, including a first energy storage module 120 and a charging apparatus 110. The first energy storage module 120 is configured to store direct current electrical energy. The charging apparatus 110 is configured to convert direct current electricity stored in the first energy storage module 120 and charge a connected battery pack. In an example, the first energy storage module 120 and the charging apparatus 110 are arranged in a same housing, to save a storage space, in some embodiments. In another example, a housing of the energy storage charging apparatus 100 includes a first housing and a second housing. The first housing is configured to store the first energy storage module 120, and the second housing is configured to store the charging apparatus 110. The first housing and the second housing are detachably connected, so that the first energy storage module 120 and the charging apparatus are detachable, and further, the user can replace the first energy storage module 120.

When the first energy storage module 120 and the charging apparatus 110 are detachably connected, the first energy storage module 120 and the charging apparatus 110 are connected by a cable in some embodiments. The cable has one end detachably connectable to the first energy storage module 120 and an other end detachably connectable to a direct current interface of the charging apparatus 110.

Further, the first energy storage module 120 and the charging apparatus 110 are stacked in some embodiments, so that when the energy storage charging apparatus is mounted with a gardening tool transportation vehicle, a space in the vehicle can be saved. The charging apparatus 110 includes a first charging module 130 and a charging interface module 140.

In the charging apparatus 110, the first charging module 130 has an input end connected to an output end of the first energy storage module 120 and an output end connected to the charging interface module 140. The charging interface module 140 is configured to connect to a battery pack. The first charging module 130 is configured to transfer electrical energy of the first energy storage module 120 to the charging interface module, and charge the battery pack. The battery pack is configured to be detachably mounted with an electrical tool, to supply power to the electrical tool. A first charging rate at which the first energy storage module 120 charges the battery pack is greater than a second charging rate at which mains electricity charges the battery pack, and a ratio of the first charging rate to the second charging rate is greater than 1 and less than or equal to 10.

In this embodiment, a charging rate of the battery pack is a ratio of an input power received by the battery pack to a rated power quantity of the battery pack. To be specific, a larger input power received by the battery pack indicates a larger charging rate of the battery pack, and correspondingly, a charging speed of the battery pack is higher The first charging rate of the first energy storage module 120 for the battery pack is a ratio of a maximum output power output to the battery pack by the first energy storage module 120 to the rated power quantity of the battery pack. The second charging rate of the mains electricity for the battery pack is a ratio of a maximum output power of the mains electricity to the rated power quantity of the battery pack. When a conventional charger charges a battery pack, an input power supply is usually the mains electricity and is limited by a power of the mains electricity. A charging speed of the battery pack is low. According to the energy storage charging apparatus provided in this embodiment, the battery pack is charged by using a direct current electrical energy storage module, so that a charging power of the battery pack can be increased, and a charging speed can be increased.

Specifically, a charging power provided by the first energy storage module 120 can make the first charging rate of the battery pack greater than or equal to 3 C. In some embodiments, the first charging rate is 3 C, 4 C, 5 C, 6 C, 10 C, or 12 C. However, a charging power provided by the mains electricity can only support the second charging rate of the battery pack to range from 1 C to 2 C. Therefore, a charging speed of the battery pack charged by using the first energy storage module is much higher than a speed at which the charger charges the battery pack using the mains electricity.

Correspondingly, for the same battery pack, a first charging time required by the first energy storage module 120 for charging the battery pack from an empty state to a fully charged state is less than a second charging time required by the alternating current power supply for charging the battery pack from the empty state to the fully charged state.

In at least one embodiment, a maximum output power of the first energy storage module 120 is greater than a maximum output power of the mains electricity. A ratio of the maximum output power of the first energy storage module 120 to the maximum output power of the alternating current power supply is greater than 1 and less than or equal to 10. For example, a ratio of the maximum output power of the first energy storage module 120 to the maximum output power of the alternating current power supply is 2, 3, 4, 5, 6, 8, or 10 in some embodiments. The maximum output power of the first energy storage module 120 is greater than or equal to 1.8 KW. In some embodiments, the maximum output power of the first energy storage module is greater than or equal to 3 KW. For example, the maximum output power of the first energy storage module 120 is 3.6 KW, 4 KW, 5 KW, 6 KW, 7 KW, 10 KW, or 12 KW. The output power of the mains electricity is less than 1.8 KW.

In at least one embodiment, the first energy storage module 120 serves as a direct current power supply, and a power quantity stored in the first energy storage module 120 is greater than or equal to 2 KWh. Further, a rated power quantity of the first energy storage module 120 is greater than or equal to 5 KWh and less than or equal to 20 KWh. When the power quantity stored in the first energy storage module 120 is greater than 20 KWh, a volume and a weight of the first energy storage module 120 also increase accordingly, resulting in inconvenient carrying. When the power quantity stored in the first energy storage module 120 is less than 3 KWh, a power need of the gardening team for one day of outdoor working cannot be satisfied. By setting the power quantity stored in the first energy storage module 120 to be greater than or equal to 2 KWh and less than or equal to 10 KWh, the energy storage charging apparatus 100 not only can store electrical energy supporting the gardening team working outdoors for at least one day, but also can be conveniently carried in terms of size and weight. Specifically, the power quantity stored in the first energy storage module 120 is 3 KWh, 4 KWh, 5 KWh, 6 KWh, 7 KWh, 8 KWh, 9 KWh, 10 KWh, 12 KWh, 15 KWh, 18 KWh, or 20 KWh in some embodiments. In some embodiments, a power quantity stored in the first energy storage module 120 is 5 KWh or 7.7 KWh in some embodiments. The first energy storage module 120 is a battery pack in some embodiments. The battery pack includes a plurality of battery cores. The plurality of battery cores are connected in series and/or parallel. In this embodiment, the battery pack includes 15 battery cores in some embodiments, and the 15 battery cores are connected in series. The second energy storage module is a battery pack of the electrical tool in some embodiments. The battery pack is directly plugged to the electrical tool to supply power to the electrical tool in some embodiments. A power quantity of the battery pack is not greater than 1 KWh. Generally, the power quantity of the battery pack ranges from 0.5 KWh to 0.6 KWh. Since the power quantity stored in the first energy storage module 120 is much greater than the power quantity stored in the battery pack, a plurality of battery packs can be recharged by carrying the first energy storage module 120.

In this embodiment, a voltage platform of the first energy storage module 120 is not less than 30 V. In some embodiments, the voltage platform of the first energy storage module is 48 V, 56 V, or 60 V in some embodiments. Since the power quantity stored in the first energy storage module 120 is much greater than the rated power quantity of the battery pack, and the voltage platform of the first energy storage module 120 is high, the first energy storage module 120 can support large-power discharging, so that the battery pack can be charged fast. Further, a continuous discharging rate of the first energy storage module 120 is not less than 1 C. In other words, during continuous discharging in which the first energy storage module 120 discharges from a remaining power quantity of greater than or equal to 90% to a remaining power quantity of at least less than or equal to 10%, a discharging rate is always not less than 1 C. Therefore, the first energy storage module 120 can support a large output power, to charge the battery pack fast.

Further, the charging apparatus 110 further includes a second charging module. The second charging module has an input end connected to mains electricity, and is configured to convert alternating current electrical energy provided by the mains electricity into direct current electrical energy. The second charging module has an output end connected to the first energy storage module 120 and the first charging module respectively, and is configured to charge the first energy storage module and charge the battery pack through the first charging module. The energy storage charging apparatus provided in this embodiment can charge the battery pack by using not only the direct current electrical energy of the first energy storage module, but also the alternating current power supply, and can also recharge energy for the first energy storage module by using the alternating current power supply, thereby satisfying needs of the user in different scenarios and relieving the user from anxiety about power consumption when the user uses the electrical tool outdoors.

In at least one embodiment, the first charging module includes at least a first charging unit and a second charging unit. The charging interface module includes at least a first charging interface and a second charging interface. An input end of the first charging unit and an input end of the second charging unit are both connected to an output end of the first energy storage module and an output end of the second charging module. An output end of the first charging unit is connected to the first charging interface. An output end of the second charging unit is connected to the second charging interface.

In at least one embodiment, the charging apparatus further includes a switch module. The switch module includes at least a first switching switch. The first switching switch has one end connected to the output end of the first charging unit and an other end connected to the output end of the second charging unit, and is configured to control a connection relationship between the charging units. When the first switching switch is closed, the output end of the first charging unit and the output end of the second charging unit are connected to each other, to output both electrical energy of the first charging unit and electrical energy of the second charging unit to a same charging interface. When the first switching switch is open, the output end of the first charging unit and the output end of the second charging unit are disconnected, to output the electrical energy of the first charging unit to the first charging interface and the electrical energy of the second charging unit to the second charging interface. The energy storage charging apparatus further includes a control module. The control module is connected to a control terminal of the first switching switch and configured to control the first switching switch to switch between a closed state and an open state.

In at least one embodiment, the energy storage charging apparatus includes at least a first charging mode and a second charging mode. When the control module controls the first switching switch to open, the energy storage charging apparatus is in the first charging mode, and each charging unit respectively provides electrical energy to a single charging interface to which the charging unit is correspondingly connected. When the control module controls the first switching switch to be closed, the energy storage charging apparatus is in the second charging mode, and at least two charging units are connected in parallel to provide electrical energy to one charging interface. A maximum output power output by the charging interface to the battery pack in the first charging mode is less than a maximum output power output by the charging interface to the battery pack in the second charging mode.

In at least one embodiment, in the second charging mode, the maximum output power output by the charging interface to the battery pack is not less than 3.6 KW.

In at least one embodiment, the charging apparatus 110 further includes a human-computer interaction module. The human-computer interaction module is connected to the control module. The control module is configured to receive a fast charging instruction through the human-computer interaction module, and control, according to the fast charging instruction, the first switching switch to be closed, to make the energy storage charging apparatus to enter the second charging mode.

For specific limitations of the charging apparatus in the foregoing embodiments, reference may be made to the limitations in the foregoing embodiments, and details are not described herein again.

By charging the battery pack using a direct current power supply stored in an energy storage module, the energy storage charging apparatus of this embodiment can resolve the problems of a limited charging power and a low charging speed resulting from obtaining mains electricity by a conventional charger from a socket. An output power of the energy storage module is greater than a power of the mains electricity. Therefore, a charging speed at which the battery pack is charged using the energy storage module is also higher than a charging speed at which the mains electricity charges the battery pack.

Figure 14:
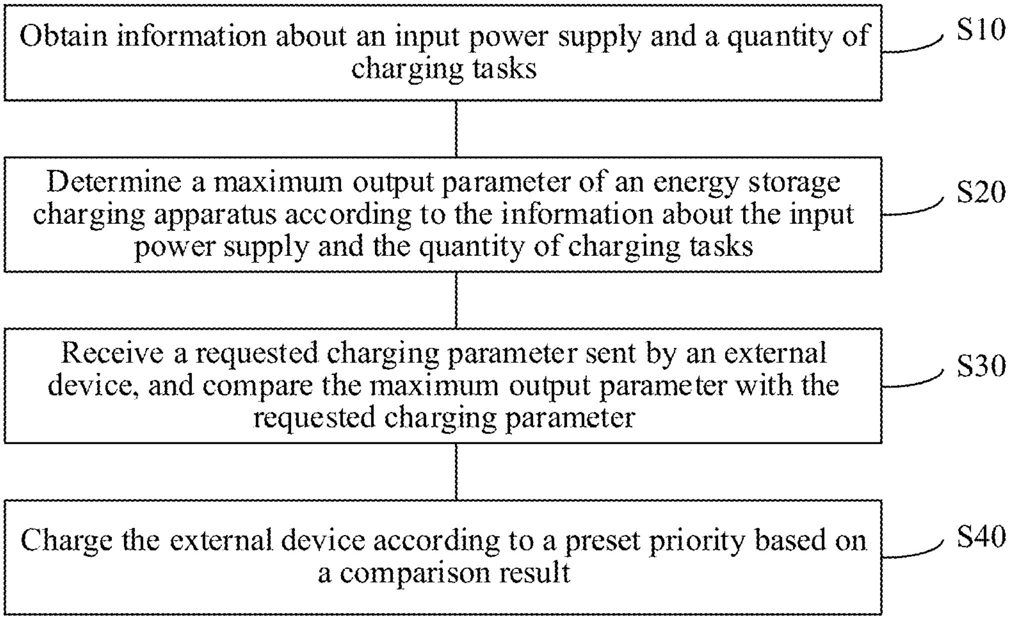
FIG. 14 is a flowchart of a charging control method for a charging apparatus according to an embodiment of this application.

Another embodiment of this application provides a charging control method for a charging apparatus. The method is based on the foregoing charging apparatus, and the method is performed by the foregoing control apparatus. As shown in FIG. 14, the charging control method includes the following steps:

Step S10: Obtain information about an input power supply and a quantity of charging tasks, wherein the input power supply includes a first energy storage module and/or an alternating current power supply, and the quantity of charging tasks is related to a quantity of external devices.

That the step of obtaining the quantity of charging tasks includes obtaining a quantity of charging tasks of each charging unit, wherein the quantity of charging tasks is the same as a quantity of second energy storage modules to which the charging unit is connected.

Step S20: Determine a maximum output parameter of an energy storage charging apparatus according to the information about the input power supply and the quantity of charging tasks, wherein the maximum output parameter is a maximum output current or a maximum output power in some embodiments.

Step S30: Receive a requested charging parameter sent by an external device, and compare the maximum output parameter with the requested charging parameter, wherein the requested charging parameter is a requested charging current or a requested charging power in some embodiments.

Step S40: Charge the external device according to a preset priority based on a comparison result.

Figure 15:
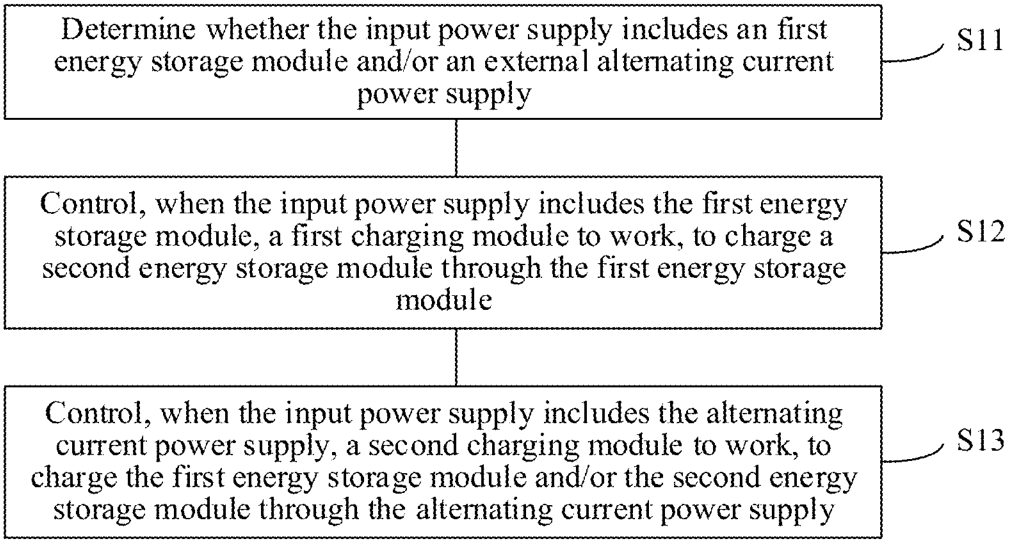
FIG. 15 is a flowchart of a charging control method for a charging apparatus according to another embodiment of this application.

In an embodiment, as shown in FIG. 15, in step S10, that the step of obtaining information about the input power supply includes:

Step S11: Determine whether the input power supply includes a first energy storage module and/or an external alternating current power supply.

Step S12: Control, when the input power supply includes the first energy storage module, a first charging module to work, to charge a second energy storage module through the first energy storage module.

Figure 16:
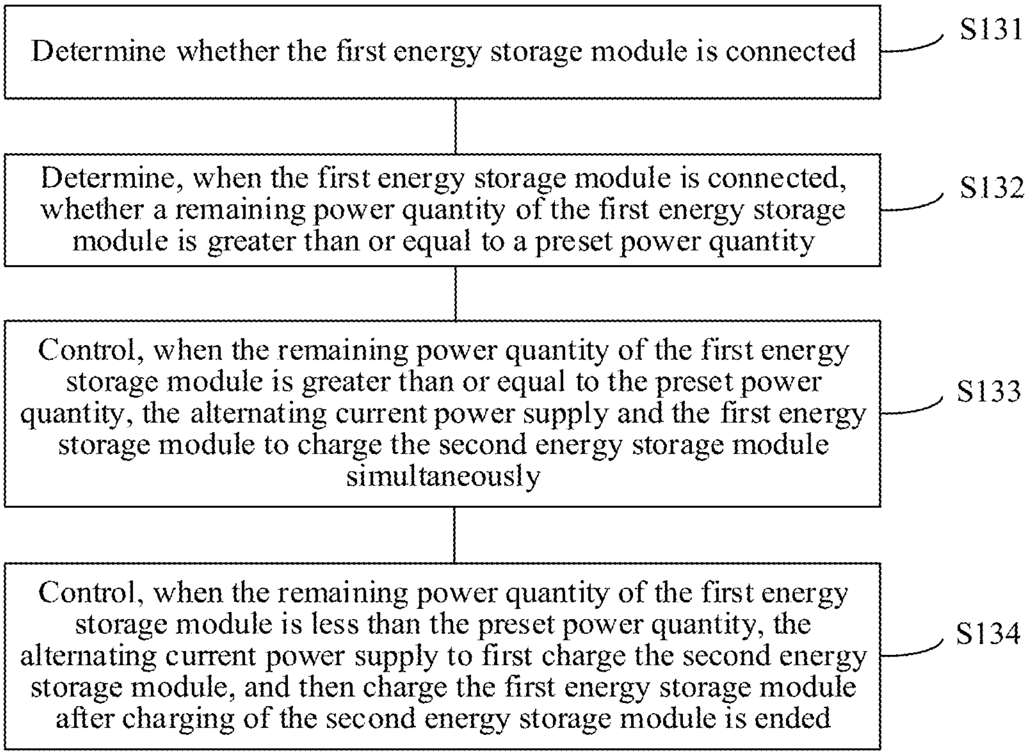
FIG. 16 is a flowchart of a charging control method for a charging apparatus according to another embodiment of this application.

Step S13: Control, when the input power supply includes the alternating current power supply, a second charging module to work, to charge the first energy storage module and/or the second energy storage module through the alternating current power supply. Further, as shown in FIG. 16, step S13 further includes:

Step S131: Determine whether the first energy storage module is connected.

Step S132: Determine, when the first energy storage module is connected, whether a remaining power quantity of the first energy storage module is greater than or equal to a preset power quantity.

Step S133: Control, when the remaining power quantity of the first energy storage module is greater than or equal to the preset power quantity, the alternating current power supply and the first energy storage module to charge the second energy storage module simultaneously.

Step S134: Control, when the remaining power quantity of the first energy storage module is less than the preset power quantity, the alternating current power supply to first charge the second energy storage module, and then charge the first energy storage module after charging of the second energy storage module is ended Step S133 further includes controlling the alternating current power supply to charge the first energy storage module after charging the second energy storage module by the alternating current power supply and the first energy storage module is ended.

In at least one embodiment, in step S20, determining a maximum output parameter of the energy storage charging apparatus according to the information about the input power supply and the quantity of charging tasks includes: determining whether a fast charging instruction is received; determining, when the fast charging instruction is received, according to the information about the input power supply, whether entering the second charging mode is allowed, and controlling, when the entering the second charging mode is allowed, at least two charging units to be connected in parallel, to charge a single second charging module, and calculating a maximum discharge parameter in the second charging mode according to the information about the input power supply; and entering the first charging mode when the entering the second charging mode is not allowed, determining whether to allow a plurality of charging units to work simultaneously in the first charging mode, and calculating, according to a determining result, with reference to the information about the input power supply, a maximum output power of a charging interface when the plurality of charging units work simultaneously or the maximum output power of the charging interface when the plurality of charging units work sequentially.

In the foregoing charging control method for a charging apparatus, a battery pack of an electrical tool is charged through the first energy storage module 120 in some embodiments, and the first energy storage module 120 and the battery pack are charged through an alternating current power supply in some other embodiments. When a gardening team works outdoors during the day, and no alternating current power supply is available, in some embodiments, the battery pack of the electrical tool is charged directly by carrying a large-capacity first energy storage module 120, thereby relieving the gardening team from anxiety about power consumption during outdoor working. When the gardening team does not work at night, the battery pack and the first energy storage module 120 are charged by using the alternating current power supply in some embodiments, so that during outdoor working, the gardening team can carry a plurality of battery packs and the first energy storage module 120 that are fully charged.

What is claimed is:

1. A charging apparatus, configured to charge a second energy storage module, wherein the charging apparatus comprises a first charging module and a charging interface module, wherein the first charging module comprises at least a first charging unit and a second charging unit;

the charging interface module comprises at least a first charging interface and a second charging interface, wherein an output end of the first charging unit is connected to the first charging interface and an output end of the second charging unit is connected to the second charging interface; and the charging apparatus comprises at least a first charging mode and a second charging mode, wherein in the second charging mode, at least the first charging unit and the second charging unit are connected in parallel to provide electrical energy to one charging interface of the first charging interface and the second charging interface; and a maximum output power output by the first charging interface in the first charging mode is less than a maximum output power output by the second charging interface in the second charging mode, wherein the charging apparatus further comprises a switch module, and the switch module comprises at least a first switching switch, wherein the first switching switch has one end connected to the output end of the first charging unit and another end connected to the output end of the second charging unit, and is configured to control a connection relationship between the first charging unit and the second charging unit, wherein when the first switching switch is closed, the output end of the first charging unit and the output end of the second charging unit are connected to each other to output electrical energy of the first charging unit and electrical energy of the second charging unit to the first charging interface or the second charging interface.

2. The charging apparatus according to claim 1, wherein when the first switching switch is open, the output end of the first charging unit and the output end of the second charging unit are disconnected, to output the electrical energy of the first charging unit to the first charging interface and the electrical energy of the second charging unit to the second charging interface.

3. The charging apparatus according to claim 1, wherein the charging apparatus further comprises a control module; wherein in the second charging mode, the control module obtains a requested charging power of the second energy storage module and a maximum output power of a charging unit of the first charging unit and the second charging unit which charges the second energy storage module, compares the requested charging power with the maximum output power, and determines, according to a comparison result, whether to control the first switching switch to close, wherein when the requested charging power is less than or equal to the maximum output power, the control module controls the first switching switch to open, to make the first charging unit and the second charging unit respectively to charge the second energy storage module connected thereto; and when the requested charging power is greater than the maximum output power, the control module controls the first switching switch to close, to make at least the first charging unit and the second charging unit to be connected in parallel to charge the second energy storage module.

4. The charging apparatus according to claim 1, wherein the charging apparatus comprises a control module; wherein the charging interface module further comprises an alternating current input interface and a first direct current interface unit, wherein the alternating current input interface is configured to be connectable to an alternating current power supply, and the first direct current interface unit is configured to be connectable to a first energy storage module; and the control module is configured to obtain information about an input power supply of the alternating current input interface and the first direct current interface unit, and determine, according to the information about the input power supply, whether the charging apparatus is allowed to enter the second charging mode.

5. The charging apparatus according to claim 4, wherein when the input power supply is the alternating current power supply, the control module prohibits the charging apparatus from entering the second charging mode;

when the input power supply comprises the first energy storage module, and a remaining power quantity of the first energy storage module is less than a preset power quantity, the control module prohibits the charging apparatus from entering the second charging mode; and when the input power supply is the first energy storage module, and the remaining power quantity of the first energy storage module is greater than or equal to the preset power quantity, the charging apparatus is allowed to enter the second charging mode.

6. The charging apparatus according to claim 5, wherein the control module is configured to obtain a temperature of the second energy storage module and a temperature of the first energy storage module when the input power supply is the first energy storage module, and the remaining power quantity of the first energy storage module is greater than or equal to the preset power quantity, and allow the charging apparatus to enter the second charging mode when the temperature of the second energy storage module and the temperature of the first energy storage module satisfy a preset temperature condition.

7. The charging apparatus according to claim 1, wherein the charging apparatus comprises a control module;

the charging apparatus further comprises a human-computer interaction module connected to the control module, and configured to obtain a fast charging instruction, wherein the fast charging instruction is used to instruct the charging apparatus to enter the second charging mode, wherein when the human-computer interaction module does not receive the fast charging instruction, the control module controls the charging apparatus to enter the first charging mode; and when the human-computer interaction module receives the fast charging instruction, the control module controls the charging apparatus to switch from the first charging mode to the second charging mode.

8. The charging apparatus according to claim 4, wherein in the first charging mode, when determining that at least the first charging unit and the second charging unit are each connected to a second energy storage module, the control module is further configured to obtain information about an input power supply of the charging apparatus, and control, according to the information about the input power supply, at least the first charging unit and the second charging unit to charge second energy storage modules connected thereto simultaneously or sequentially.

9. The charging apparatus according to claim 8, wherein when the input power supply is the alternating current power supply, the control module controls at least the first charging unit and the second charging unit to charge the second energy storage modules connected thereto simultaneously;

when the input power supply comprises the first energy storage module, and a remaining power quantity of the first energy storage module is less than a preset power quantity, the control module controls at least the first charging unit and the second charging unit to charge the second energy storage modules connected thereto sequentially; and when the input power supply is the first energy storage module, and the remaining power quantity of the first energy storage module is greater than or equal to the preset power quantity, the control module controls at least the first charging unit and the second charging unit to charge the second energy storage modules connected thereto simultaneously.

10. The charging apparatus according to claim 3, wherein the first charging unit is connected to at least two charging interfaces and the second charging unit is connected to at least two charging interfaces; and in the first charging mode, when determining that a plurality of charging interfaces connected to the first charging unit and the second charging unit are each connected to a second energy storage module, the control module is further configured to obtain information about a plurality of second energy storage modules and information about an input power supply, and control, based on the information about the plurality of second energy storage modules and the information about the input power supply, the first charging unit and the second charging unit to charge the plurality of second energy storage modules sequentially according to a preset priority.

11. The charging apparatus according to claim 10, wherein the second energy storage module comprises a battery pack and a self-moving tool, wherein the battery pack is configured to be detachably mounted on an electrical tool and supply power to the electrical tool, and the self-moving tool has a built-in battery;

the control module determines whether the second energy storage module connected to the charging interface module comprises the battery pack and the self-moving tool, when the second energy storage module comprises the battery pack and the self-moving tool, the control module determines whether the input power supply comprises an alternating current power supply, and when the input power supply comprises the alternating current power supply, a charging priority of the battery pack is higher than a charging priority of the first energy storage module, and the charging priority of the first energy storage module is higher than a charging priority of the self-moving tool; and when the control module determines that the input power supply does not comprise the alternating current power supply and the input power supply comprises the first energy storage module, the charging priority of the battery pack is higher than the charging priority of the self-moving tool.

12. The charging apparatus according to claim 4, wherein the charging apparatus further comprises a second charging module;

the second charging module has a first end connected to the alternating current input interface and a second end connected to the first direct current interface unit, and is configured to convert alternating current electrical energy into direct current electrical energy and output the direct current electrical energy to the first direct current interface unit, to charge the first energy storage module; and the second charging module is further configured to convert the alternating current electrical energy into direct current electrical energy, and transmit the direct current electrical energy to the first charging interface and/or the second charging interface not through the first energy storage module, to charge the second energy storage module.

13. The charging apparatus according to claim 12, wherein the charging interface module comprises a second direct current interface unit, wherein the second direct current interface unit comprises at least the first charging interface and the second charging interface; and the second charging module has an output end connected to the first charging module, to transmit the direct current electrical energy to the second direct current interface unit through the first charging module.

14. The charging apparatus according to claim 13, wherein the control module is configured to determine the type of an input power supply, and control, according to the type of the input power supply, a manner in which the charging apparatus charges the second energy storage module, wherein the input power supply comprises the alternating current power supply and the first energy storage module.

15. The charging apparatus according to claim 1, wherein the first charging module is a bidirectional charging module, and the second energy storage module is further configured to charge a first energy storage module through the first charging module.

16. The charging apparatus according to claim 1, wherein a maximum output power of the first charging unit is the same as a maximum output power of the second charging unit.

17. The charging apparatus according to claim 1, wherein in the first charging mode, a maximum output power output by the first charging unit or the second charging unit is not less than 1.8 KW and not more than 3.6 KW; and in the second charging mode, a maximum output power output by the first charging unit and the second charging unit is not less than 3.6 KW and not more than 7.2 KW.

18. A charging apparatus, configured to charge a second energy storage module, wherein the charging apparatus comprises a charging module and a charging interface module, wherein the charging module comprises at least a first charging unit and a second charging unit;

the charging interface module comprises at least a first charging interface and a second charging interface, wherein an output end of the first charging unit is connected to the first charging interface and an output end of the second charging unit is connected to the second charging interface; and the charging apparatus comprises at least a first charging mode and a second charging mode, wherein in the second charging mode, at least the first charging unit and the second charging unit are connected in parallel to provide electrical energy to the first charging interface or the second charging interface; and a maximum output power output by the first charging interface in the first charging mode is less than a maximum output power output by the second charging interface in the second charging mode; wherein the charging apparatus comprises a control module;

the charging apparatus further comprises a human-computer interaction module connected to the control module, and configured to obtain a fast charging instruction, wherein the fast charging instruction is used to instruct the charging apparatus to enter the second charging mode, when the human-computer interaction module does not receive the fast charging instruction, the control module controls the charging apparatus to enter the first charging mode; and when the human-computer interaction module receives the fast charging instruction, the control module controls the charging apparatus to switch from the first charging mode to the second charging mode.

19. The charging apparatus according to claim 18, wherein while obtaining the fast charging instruction, one of the first charging interface and the second charging interface is designated as a fast charging interface through the human-computer interaction module; and the charging apparatus is configured to perform fast charging for a battery pack connected to the fast charging interface after receiving the fast charging instruction and corresponding information that indicates the fast charging interface.

20. The charging apparatus according to claim 18, wherein the second energy storage module comprises a battery pack and a self-moving tool, wherein the battery pack is configured to be detachably mounted on an electrical tool and supply power to the electrical tool, and the self-moving tool has a built-in battery;

a priority charging instruction is received through the human-computer interaction module, to instruct the charging apparatus to charge the self-moving tool first;

when the human-computer interaction module receives the priority charging instruction, the control module is configured to charge the self-moving tool first to a specified power quantity, and then charge the battery pack;

when the human-computer interaction module does not receive the priority charging instruction, the control module is configured to charge the battery pack first.

* * * * *